(12) United States Patent
Rao et al.

(10) Patent No.: US 8,571,862 B2
(45) Date of Patent: Oct. 29, 2013

(54) MULTIMODAL INTERFACE FOR INPUT OF TEXT

(76) Inventors: Ashwin P. Rao, Seattle, WA (US); Gregory M. Aronov, Seattle, WA (US); Marat V. Garafutdinov, Seattle, WA (US)

( * ) Notice: Subject to any disclaimer, the term of this patent is extended or adjusted under 35 U.S.C. 154(b) by 406 days.

(21) Appl. No.: 12/578,355

(22) Filed: Oct. 13, 2009

(65) Prior Publication Data

US 2010/0031143 A1 Feb. 4, 2010

Related U.S. Application Data

(63) Continuation-in-part of application No. 11/948,757, filed on Nov. 30, 2007.

(60) Provisional application No. 61/196,037, filed on Oct. 14, 2008, provisional application No. 60/872,467, filed on Nov. 30, 2006, provisional application No. 60/999,593, filed on Oct. 19, 2007.

(51) Int. Cl.
*G10L 15/26* (2006.01)

(52) U.S. Cl.
USPC .......................................................... 704/235

(58) Field of Classification Search
USPC .................................................. 704/231–257
See application file for complete search history.

(56) References Cited

U.S. PATENT DOCUMENTS

| | | | | |
|---|---|---|---|---|
| 5,937,380 A | * | 8/1999 | Segan | 704/235 |
| 6,496,799 B1 | * | 12/2002 | Pickering | 704/235 |
| 7,720,682 B2 | * | 5/2010 | Stephanick et al. | 704/252 |
| 7,908,142 B2 | * | 3/2011 | Yamada | 704/235 |
| 8,355,915 B2 | * | 1/2013 | Rao | 704/244 |
| 2006/0015336 A1 | * | 1/2006 | Parthasarathy | 704/235 |
| 2007/0106507 A1 | * | 5/2007 | Charoenruengkit et al. | 704/233 |
| 2009/0055174 A1 | * | 2/2009 | Han et al. | 704/235 |
| 2009/0182559 A1 | * | 7/2009 | Gerl et al. | 704/235 |

* cited by examiner

*Primary Examiner* — Abul Azad

(57) ABSTRACT

The disclosure describes an overall system/method for text-input using a multimodal interface with a combination of speech recognition and text prediction. Specifically, an "always listening" mode for entering words is combined with a push-to-speak mode for entering symbols and phrases. In addition, these two modes are further combined with keypad based text prediction. Finally, the overall user-interface of the proposed system is designed such that it enhances existing standard text-input methods; thereby minimizing the behavior change for mobile users.

17 Claims, 35 Drawing Sheets

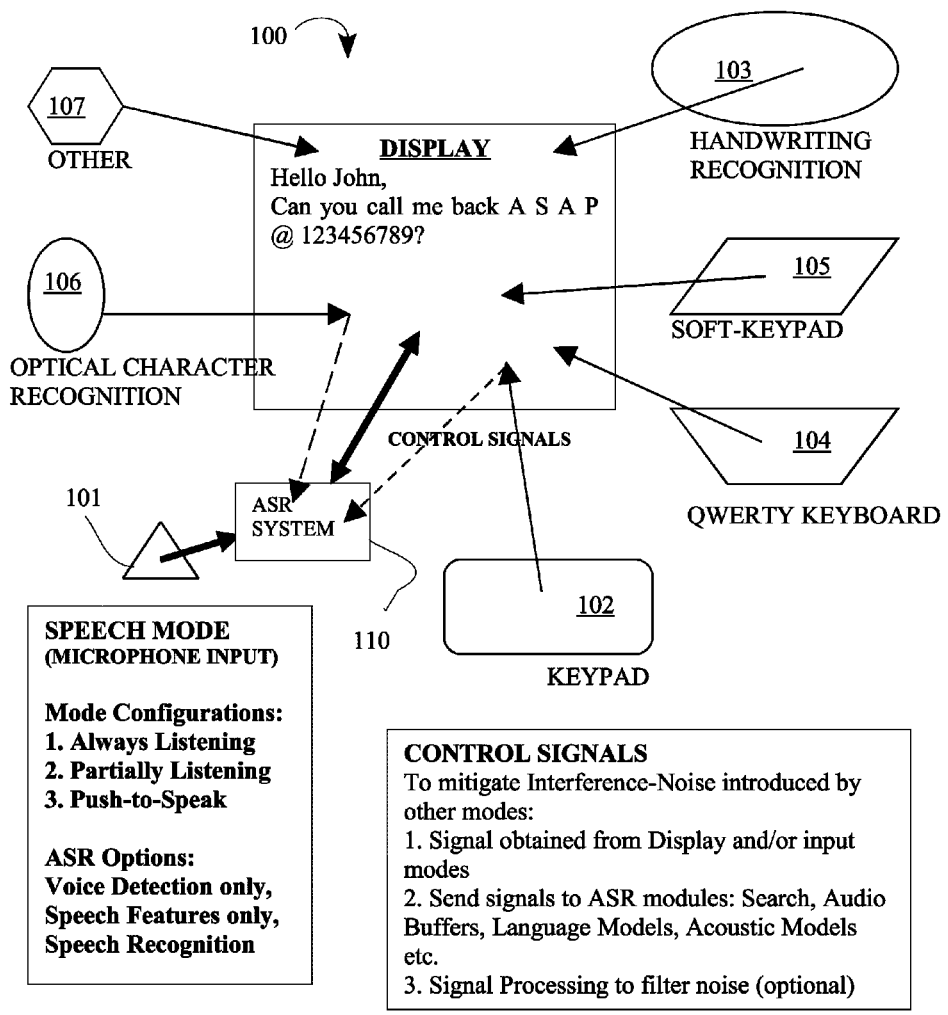

FIGURE 2G:
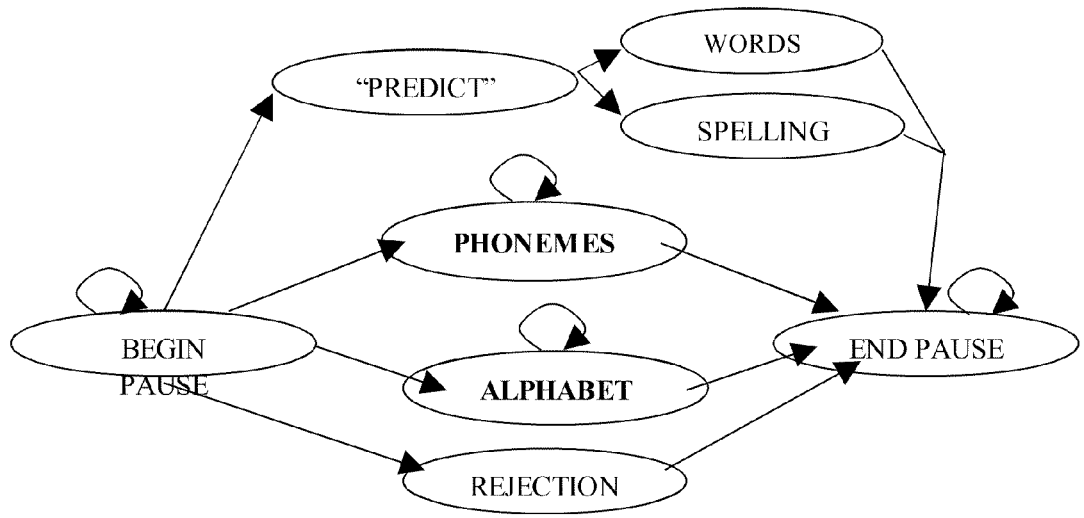
FIGURE 3A: One embodiment of algorithm for generating sub-set lexicons
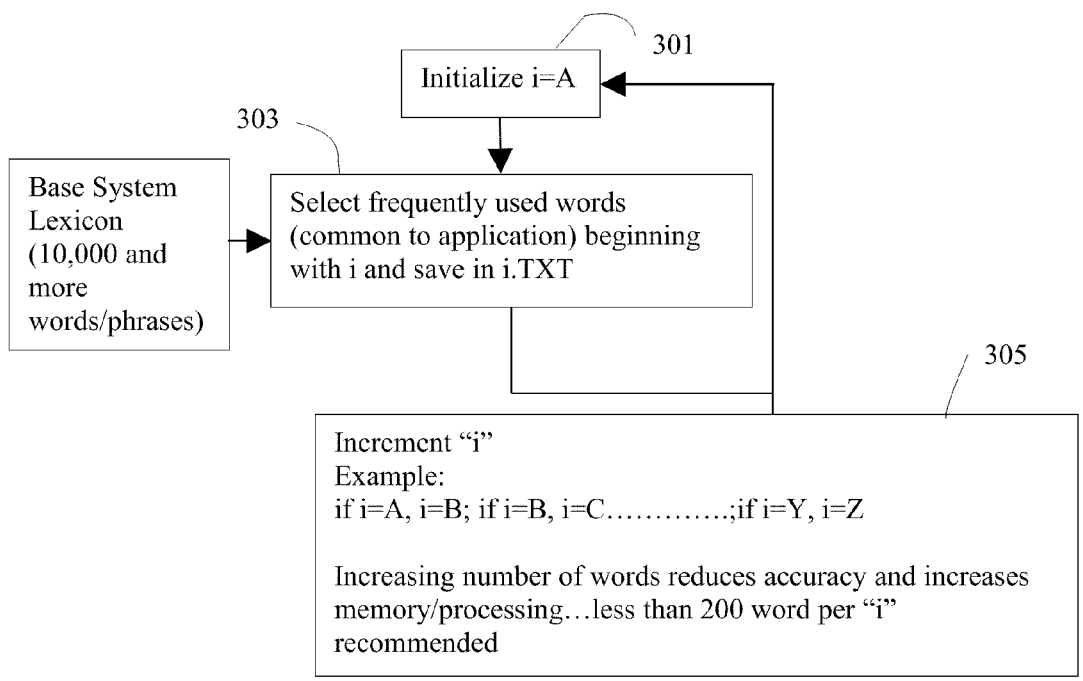

Method for predicting Word "Meeting"

Method for predicting Symbol "Comma"

Method for predicting Word "Meeting"

Method for predicting Phrase "Where is the Meeting"

Algorithm for predicting Phrase "Where is the Meeting"

Speak-and-Type Interface Using Push-to-Speak Configuration

Type-and-Speak Interface Using Push-to-Speak Configuration

Speak-and-Type Interface Using Partial Listening Configuration

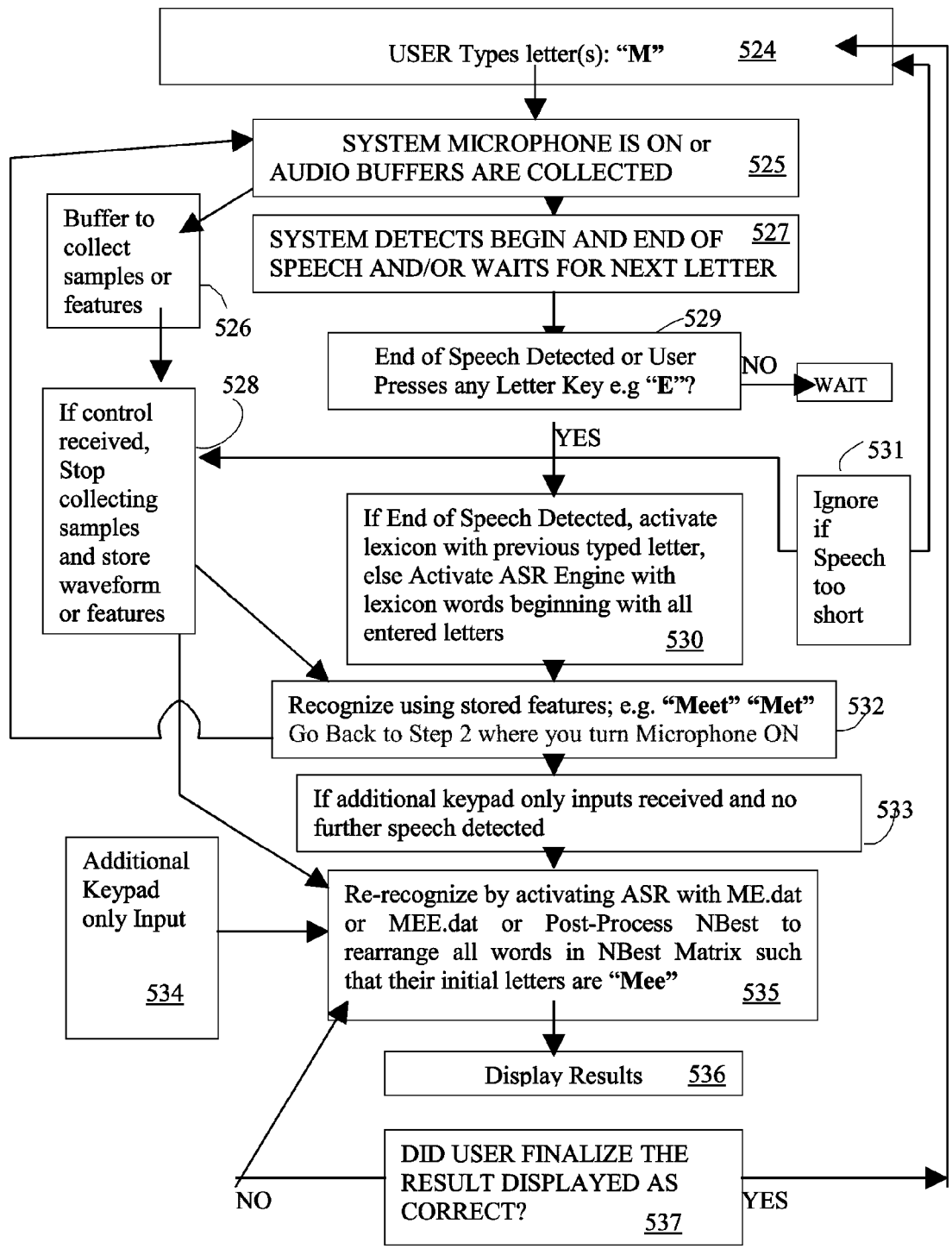

Speak-and-Type Interface Using Always Listening Configuration

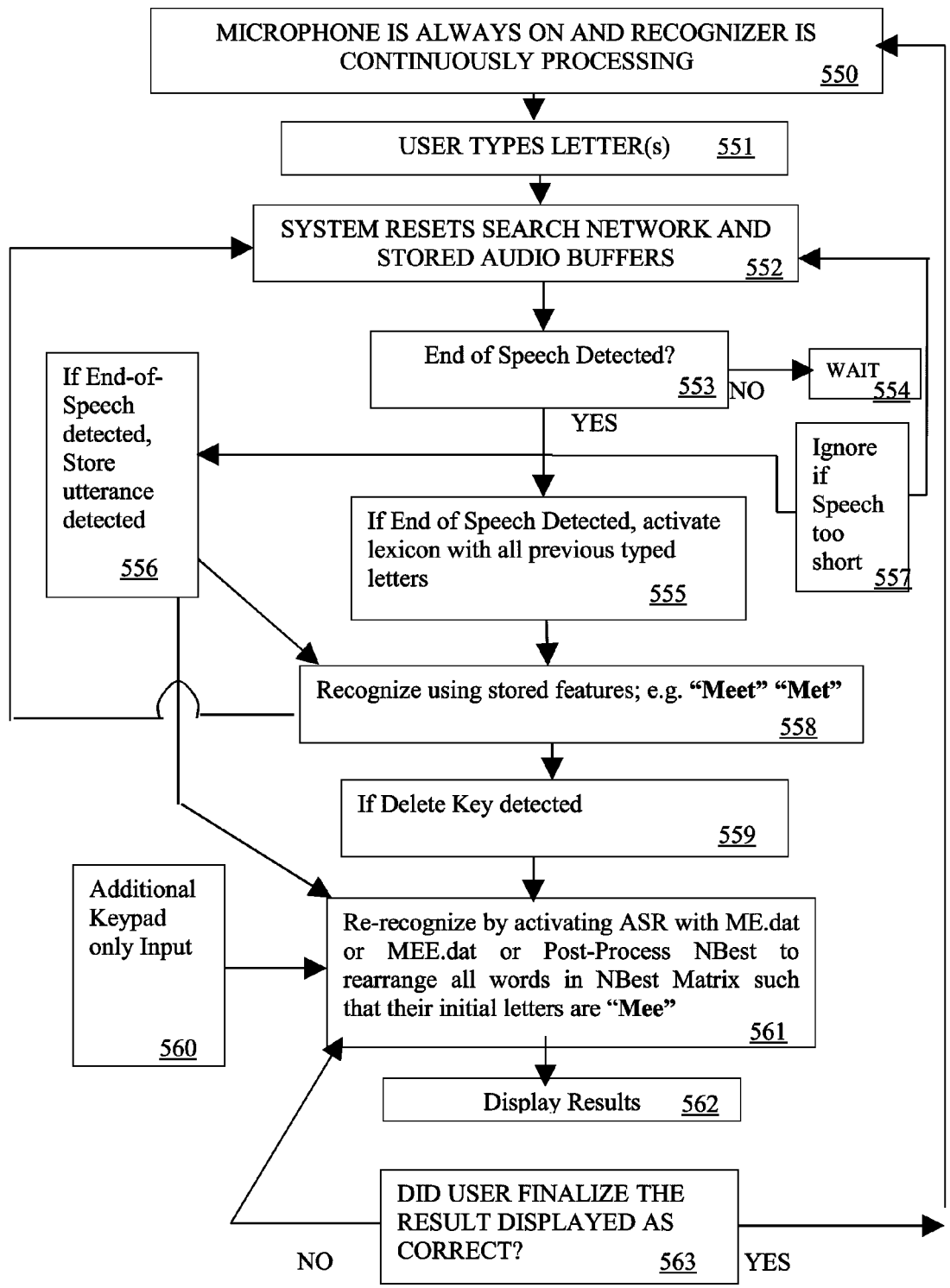

FIGURE 5G

| INPUT FUNCTIONS | KEYPAD (TYPE/TAP) | | MULTIMODAL INPUT | |
|---|---|---|---|---|
| INPUT NAMES (E.G. JOHN SMITH) | JOHN → <br><br> SELECT JOHN SMITH | | SPEAK "JOHN SMITH" → <br> TYPE "J" <br> or <br> TYPE "J" → <br> SPEAK "JOHN SMITH" <br> or <br> SPEAK "JOHN SMITH" while TYPING "J" | |
| PHRASES (E.G. AM DRIVING) | AM DRIV → <br> SELECT AM DRIVING | | SPEAK "AM DRIVING"→ <br> TYPE "A" <br> Or <br> Type "A"→Speak "Am Driving" <br> Or <br> Speak "Am Driving" while Typing "A" | |
| SYMBOLS (E.G SEMICOLON) | PRESS * → <br> HOLD → <br> SYMBOL → <br> SCROLL → <br> SELECT SEMICOLON | | SPEAK "SEMICOLON" | |
| SHORT WORDS (E.G., CALL) | TRIPPLE.TAP | PREDICTIVE-TEXT | PROPOSED SYSTEM | |
| | | | HANDSFREE | MULTIMODE |
| | 222 → <br> 2 → <br> 555 → <br> 555 | 2 → <br> 2 → <br> 5 → <br> 5 | SPEAK: <br> CD <br> AB <br> LM <br> LM | 2 (OR 222) → <br> SPEAK "CALL" |
| LONG WORDS (E.G CONSEQUENCE) | TRIPPLE.TAP | PREDICTIVE TEXT + COMPLETION | PROPOSED SYSTEM | |
| | | | HANDSFREE | MULTIMODE |
| | 222 → <br> 666 → <br> 66 → <br> 7777 → <br> 33 → <br> 77 → <br> 88 → <br> 33 → <br> 66 → <br> 222 → <br> 33 | 2 → <br> 6 → <br> 6 → <br> 7 → <br> 3 → <br> SELECT CONSEQUENCE | SPEAK: <br> "CONSEQUENCE <br> C O" <br><br> Or <br><br> SPEAK: <br> "CONSEQUENCE <br> CD OP" | SPEAK <br> "CONSEQUENCE" <br> 2 (or 222) → <br><br> SELECT <br> CONSEQUENCE |

FIGURE 5H

| INPUT FUNCTIONS | OTHER SPEECH SYSTEMS | MULTIMODAL INPUT | |
|---|---|---|---|
| INPUT NAMES (E.G. JOHN SMITH) | SAY "JOHN SMITH" | SPEAK "JOHN SMITH" → TYPE "J" <br> or <br> TYPE "J" → SPEAK "JOHN SMITH" <br> or <br> SPEAK "JOHN SMITH" while TYPING "J" | |
| PHRASES (E.G. "AM DRIVING") | SAY "AM DRIVING" | SPEAK "AM DRIVING"→TYPE "A" <br> Or <br> Type "A"→Speak "Am Driving" <br> Or <br> Speak "Am Driving" while Typing "A" | |
| SYMBOLS (E.G. "SEMICOLON") | SAY "SEMICOLON" ALONG WITH OTHER VOICE COMMANDS | SELECT SYMBOL MODE & SAY "SEMICOLON" | |
| CHARACTERS (E.G. "C") | SAY C-CHARLIE | USE HANDSFREE OPTION SAY "CD" | |
| NUMBERS (E.G. "1 2") | SAY "1 2"... | USE HANDSFREE OPTION SAY "12 23" | |
| ISOLATED WORDS (E.G. "CALL") | NOT ACCURATE | HANDSFREE <br> "CD" → <br> "AB" → <br> "LM" → <br> "LM" | MULTIMODE <br> 222 → <br> "CALL" |
| COMMANDS + WORDS | NOT ACCURATE | ALLOWS SIMULTANEOUS USE OF COMMANDS LIKE ERASE-THAT, CHANGE-THAT WHILE DICTATING WORDS | |
| KEYPAD + SPEECH SIMULTANEOUSLY ACTIVE (MULTIMODAL) | NOT AVAILABLE | ALLOWS SIMULTANEOUS USE OF SPEECH AND/OR KEY-PAD | |
| VOICE-MODE ACTIVATION | PUSH-TO-SPEAK OR BUTTON | ALWAYS LISTENING IN ADDITION TO PUSH-TO-SPEAK | |
| SPEAKING DISTANCE | CLOSE TO MIC OR HEADPHONE | SAME DISTANCE AS TYPING | |

FIGURE 6 CONTINUED
FIGURE 6-C
USER SPEAKS "WHAT CAN I SAY" TO GET HELP WINDOW. THE ASR-ENGINE IS CONFIGURED TO SUMULTANEOUSLY LISTEN FOR COMMANDS, WORDS, AND THE PREDICT-CONTROL-COMMAND
FIGURE 6-D
USER SAYS ONE OF THE CANNED PHRASES, NAMELY "AM DRIVING". NOTICE THAT THE ALTERNATIVE "AM RUNNING LATE" IS DISPLAYED IN N-BEST WINDOW.
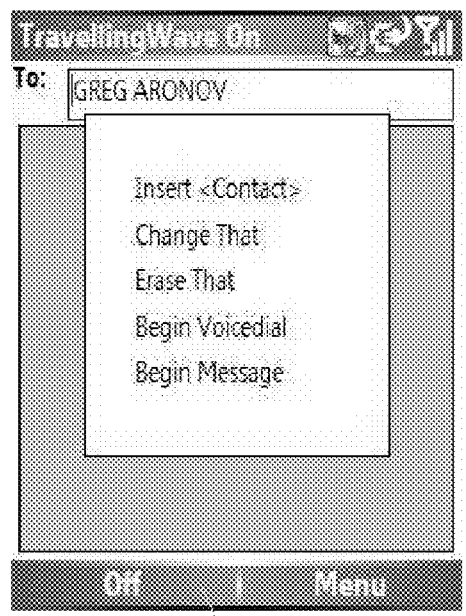
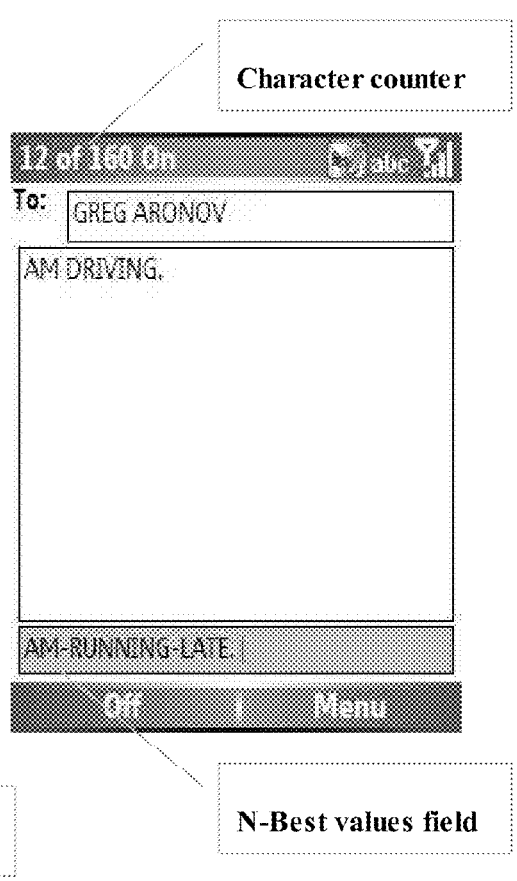
Character counter
Microphone On/Off
N-Best values field FIGURE 6 CONTINUED
FIGURE 6-E
USER SPEAKS "MN EF" USING VOICETAP TO ENTER "ME". AGAIN, ALTERNATIVES ARE DISPLAYED BELOW.
FIGURE 6-F
USER SAYS "PREDICT MEETING"; N-BEST ALTERNATIVES NAMELY MEDIATE AND METER ARE DISPLAYED WHICH BOTH BEGIN WITH LETTERS
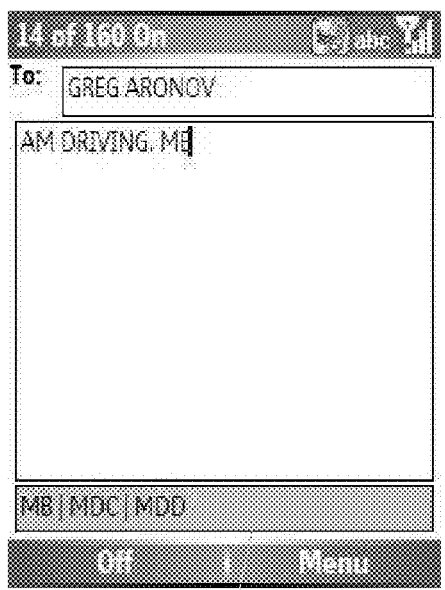
N-Best values field
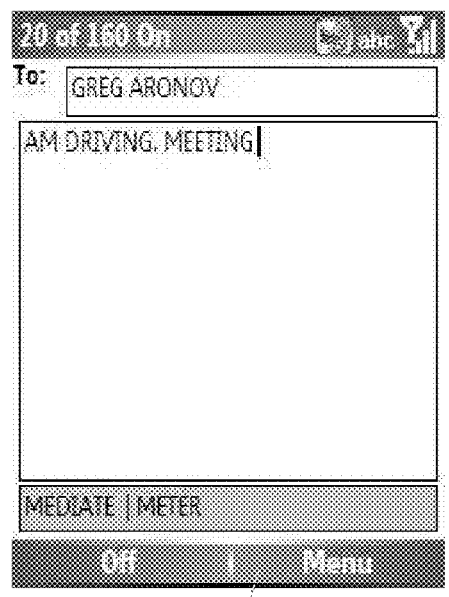
Settings Buttons

FIGURE 6 CONTINUED
FIGURE 6-I
THE INTERFACE CONTROLS THE USER BEHAVIOR BY PROVIDING FEEDBACK LIKE "SPEAK SOFTER"
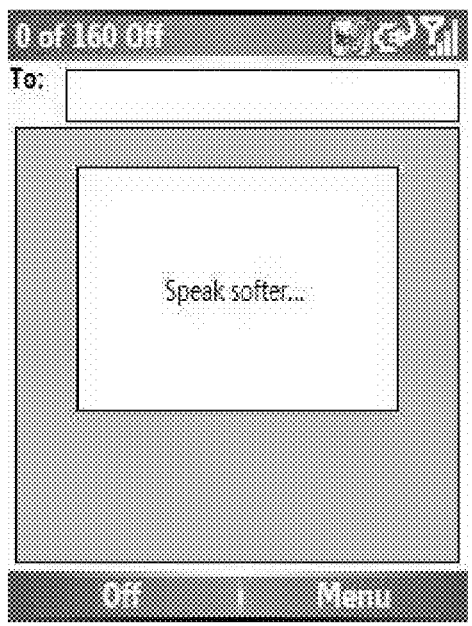
FIGURE 6-J
THE USER COULD SELECT DIFFERENT MODES BY CLICKING MENU...HERE A CHOICE BETWEEN VOICETAP AND VOICEPREDICT IS SHOWN
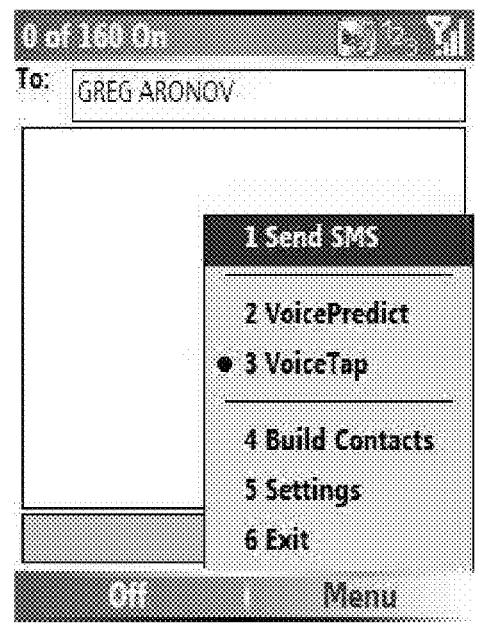

FIGURE 7

FIGURE 7-A
USER SPEAKS "ASHWIN RAO"; THE SYSTEM PROMPTS FOR THE INITIAL LETTERS; USER ENTERS THE LETTER "A"

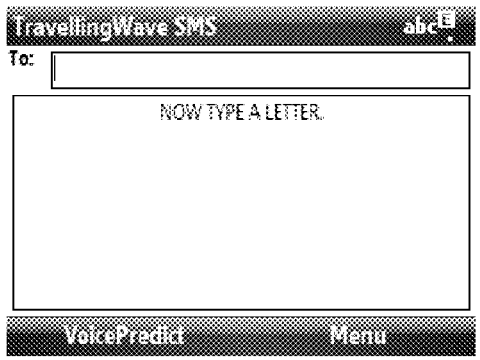

FIGURE 7-B
THE N-BEST CHOICE LIST IS DISPLAYED WHICH INCLUDE ALL CONTACTS BEGINNING WITH "A"; USER MANUALLY SCROLLS TO SELECT N-BEST ALTERNATIVE

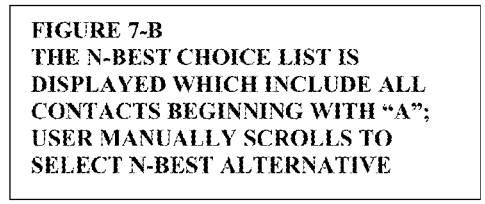

FIGURE 7-C
USER SELECTS CONTACT; USER MAY PRESS TALK BUTTON TO PLACE A CALL OR DOWN-ARROW TO GO TO MESSAGE COMPOSITION WINDOW

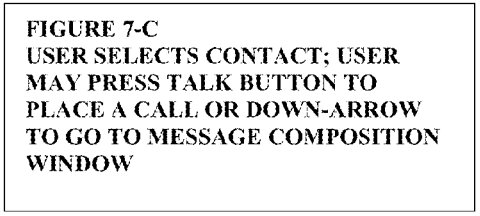
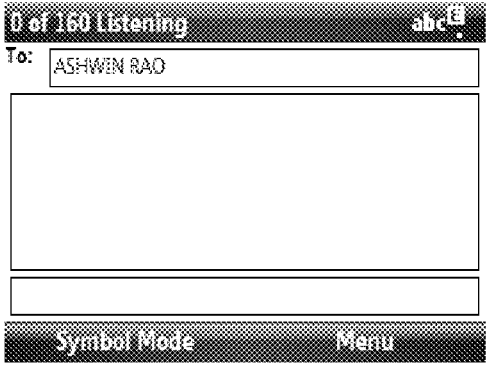

FIGURE 7-D
IN MESSAGE COMPOSITION WINDOW, SPEAKS WORD "ARRIVED" AND THEN TYPES LETTER "A" NOTICE THAT THE ALTERNATIVES ARE DISPLAYED IN N-BEST WINDOW.

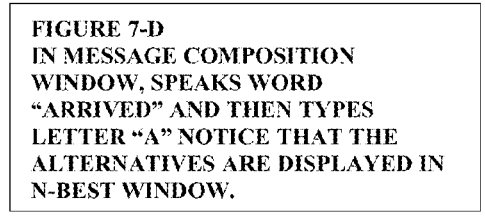
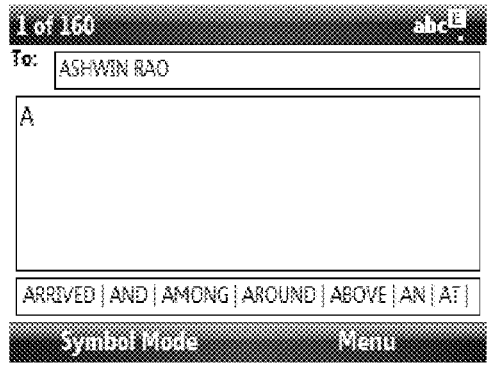

FIGURE 7 (ctd)

| FIGURE 7-E USER MAY CONTINUE TO SPEAK-AND-TYPE, OR SIMPLY TYPE; IN THIS CASE TYPES "F". OBSERVE THAT IN THE ABSENCE OF SPEECH INPUT OR BACKGROUND NOISE, THE SYSTEM DOES PURE TEXT PREDICTION | FIGURE 7-F USER MAY PRESS MENU→SETTINGS TO SELECT OPTIONS LIKE SELECTION BETWEEN PUSH-TO-SPEAK AND ALWAYS-LISTENING METHODS, RESETTING OF USER WORD FREQUENCIES ETC. | FIGURE 7-G USER MAY CLEAR ENTIRE TEXT, GET HELP, EXIT OR SEND SMS BY PRESSING MENU. HERE, USER CLEARED MESSAGE AND ENTERED NEW MESSAGE |
|---|---|---|

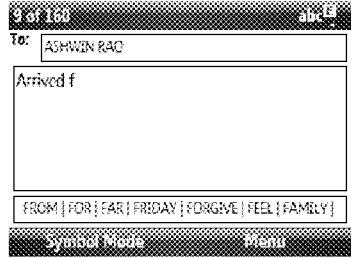 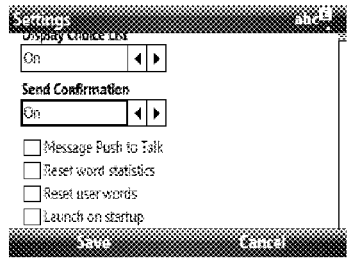 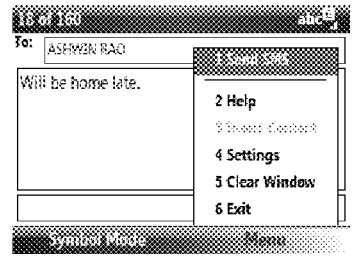

Figure 8

| FIGURE 8-A<br>USER INSERTS CONTACT AND IS IN MESSAGE COMPOSITION WINDOW. THE "VOICEPREDICT" SOFT-KEY IS A PUSH-TO-TALK BUTTON | FIGURE 8-B<br>USER PUSHES VOICEPREDIC BUTTON AND SPEAKS THE WORD "ARRIVED". SYSTEM DISPLAYS LISTENING ON TOP AND TALK-RELEASE ON SOFT-KEY |

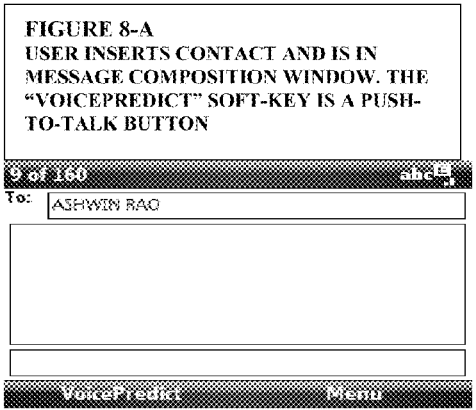
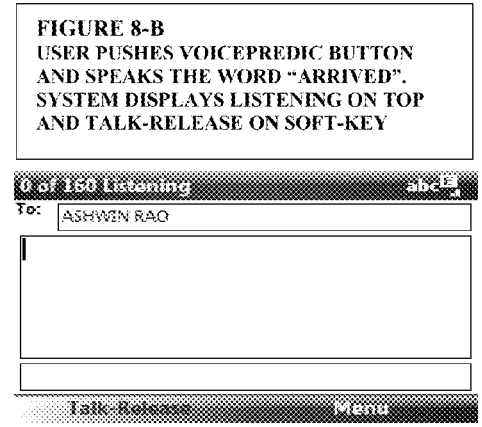

| FIGURE 8-C<br>USER RELEASES VOICEPREDEICT SOFT-KEY AND SYSTEM DISPLAYS "NOW TYPE A LETTER" | FIGURE 8-D<br>USER ENTERS THE LETTER "A" AND SYSTEM PREDICTS USING SPOKEN UTTARENCE AND THE LETTER; CHOICES DISPLAYED IN WINDOW BELOW |

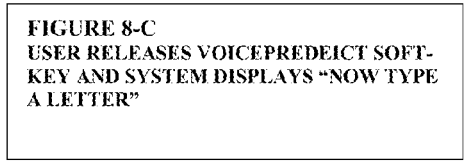
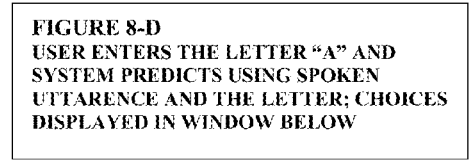

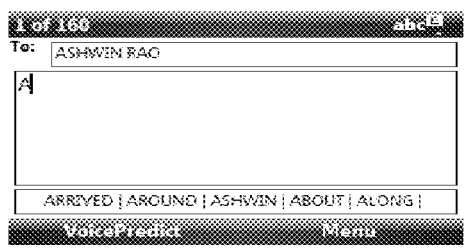

MULTIMODAL INTERFACE FOR INPUT OF TEXT

CROSS-REFERENCE TO RELATED APPLICATIONS

This patent application claims priority to U.S. Provisional Patent Application No. 61/196,037, filed Oct. 14, 2008, and is a continuation-in-part of U.S. application Ser. No. 11/948,757, filed Nov. 30, 2007, which claims priority to U.S. Provisional Patent Application No. 60/872,467, filed Nov. 30, 2006, and to U.S. Provisional Patent Application No. 60/999,593, filed Oct. 19, 2007, which are all incorporated herein by reference.

FIELD OF THE INVENTION

The invention relates to user interfaces for entering text into devices. More specifically, the invention relates to user interfaces for entering text using data input and speech recognition.

BACKGROUND INFORMATION

The problem of entering text into devices having small form factors (like cellular phones, personal digital assistants (PDAs), RIM Blackberry, the Apple iPod, and others) using multimodal interfaces (especially using speech) has existed for a while now. This problem is of specific importance in many practical mobile applications that include text-messaging (short messaging service or SMS, multimedia messaging service or MMS, Email, instant messaging or IM), wireless Internet browsing, and wireless content search.

Although many attempts have been made to address the above problem using "Speech Recognition", there has been limited practical success. The inventors have determined that this is because existing systems use speech as an independent mode, not simultaneously with other modes like the keypad; for instance a user needs to push-to-speak (may be using a Camera button on a mobile device) to activate the speech mode and then speak a command or dictate a phrase. Further on, these systems simply allow for limited vocabulary command-and-control speech input (for instance say a song title or a name or a phrase to search for a ringtone etc.). Finally, these systems require the users to learn a whole new interface-design without offering providing them the motivation to do so.

In general, contemporary systems have several limitations. Firstly, when the vocabulary list is large (for instance 1000 isolated-words or 5000 small phrases as in names/commands or 20000 long phrases as in song titles) and so on, (a) these systems' recognition accuracies are not satisfactory even when they are implemented using a distributed client-server architecture, (b) the multimodal systems are not practical to implement on current hardware platforms, (c) the systems are not fast enough given their implementation, and (d) these systems' recognition accuracies degrade in the slightest of background noise.

Secondly, the activation (and de-activation) of the speech mode requires a manual control input (for instance a push-to-speak camera-button on a mobile device). The primary reason for doing so is to address problems arising due to background noises; using the popular push-to-speak method the system's microphone is ON only when the user is speaking; hence non-speech signals are filtered out.

Thirdly, these methods design a speech mode that is independent and different compared to existing designs of non-speech modes, thus introducing a significant behavioral change for users: (a) to input a Name (Greg Simon) on a mobile device from a contact list, a standard keypad interface may include "Menu-Insert-Select Greg Simon"; a standard voice-dial software requires the user to say "Call Greg Simon" which has a different interface-design (b) to input a phrase user enters the words of that phrase one by one by using either triple-tap or predictive-text-input; a speech dictation software requires the user to push-and-hold a button and speak the whole sentence, once again a different interface-design which requires users to say the entire message continuously.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A describes one embodiment of an overall multimodal system;

FIG. 2G: Example of Word-Graph State-Machine for method in FIG. 2F . . . only a portion of states from FIG. 2C is shown for simplicity;

FIG. 3A: one embodiment of algorithm for generating sub-set lexicons;

FIG. 5D: a system in FIG. 2A using partial-listening configuration using type-and-speak user-interface;

FIG. 5F: a system in FIG. 2A using always-listening configuration using type-and-speak user-interface;

FIG. 5G illustrates an embodiment of the overall system proposed which may be viewed as a voice-analog-interface to existing text-input interfaces;

FIG. 5H compares the speech features of the proposed system to prior-art speech recognition systems for mobile devices;

FIG. 7 illustrates an application of the invention for "text-messaging" wherein the invention is viewed as a multimodal interface using the "always listening" configuration;

FIG. 8 illustrates an application of the invention for "text-messaging" wherein the invention is viewed as a multimodal interface using the "push-to-speak" configuration;

DETAILED DESCRIPTION OF THE PREFERRED EMBODIMENT

Figure 1B:
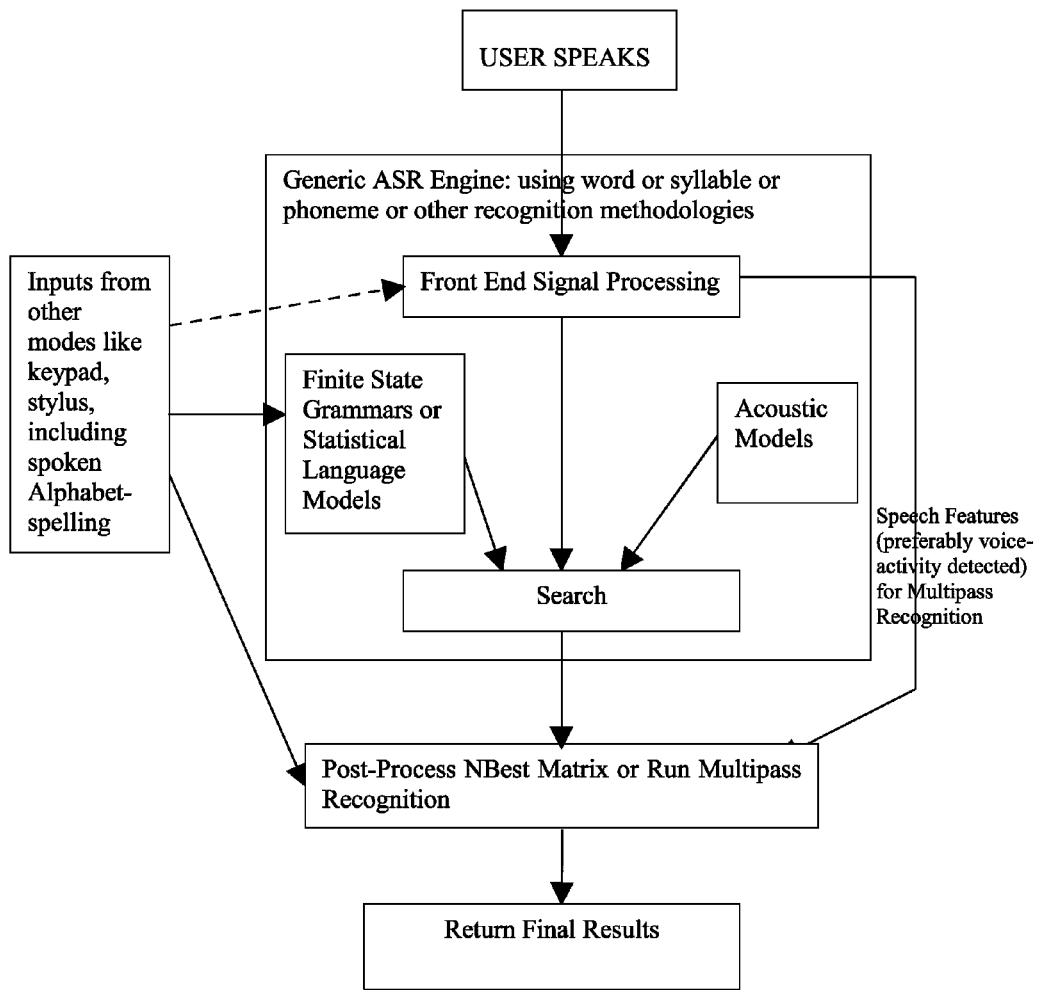
FIG. 1B describes one embodiment of an ASR engine in a multimodal system.

The following disclosure describes a multimodal speech recognition system. By way of background, speech recognition is the art of transforming audible sounds (e.g., speech) to text. "Multimodal" refers to a system that provides a user with multiple modes of interfacing with the system beyond traditional keyboard or keypad input and displays or voice outputs. Specifically for this invention, multimodal implies that the system is "intelligent" in that it has an option to combine inputs and outputs from the one or more non-speech input modes and output modes, with the speech input mode, during speech recognition and processing. The multimodal speech recognition system includes a multimodal interface. The multimodal interface complements and enhances current mobile interfaces and provides a next generation seamless multimodal mobile user experience. The multimodal speech recognition system and interface combine an "always listening" component for entering words, a keypad based text prediction component for predicting text choices based on a keypad input and spoken words, and/or a push-to-speak component for entering symbols and phrases. In addition, the multimodal speech recognition system may include a prosody extraction module for reducing the search and hence reducing the corresponding dictionary.

1. Overview of the Disclosure

An embodiment of an overall system for multimodal input is described. Next, three embodiments are described: (1) a system wherein the microphone is active all the time, thereby enabling speech input to be concurrently active along with other input-modes namely keypad, keyboard, stylus, soft-keys etc.; (2) a system wherein the microphone is only partially active enabling speech input prior to a manual text input; and (3) a system wherein the microphone is manually controlled (example using a push-to-speak button) thereby enabling speech mode to be active only if and when desired. Further, for each one of the three embodiments, three different user-interfaces are described (speak-and-type, type-and-speak, and speak-while-typing). Finally, an overall user-interface design is described which enhances existing mobile user-interfaces and hence exhibits minimal behavioral change for end-users. In addition, other embodiments for a multimodal user interface are described that incorporate (a) an always listening mode along with a push-to-speak mode and keypad input mode; and (b) a consistent always listening mode along with keypad input mode.

2. Specific Embodiments and Implementations

FIG. 1A is a conceptual overview of a system for large-vocabulary multimodal text-input using a plurality of input methods, such as speech 101, keypad 102, handwriting recognition 103, Qwerty keyboard 104, soft-keyboard 105, optical character recognition 106, and/or other non-speech input modes 107, in which embodiments of the invention may be implemented. The system 100 is but one example and others will become apparent to those skilled in the art.

The system 100 includes a speech recognition system 110 (also referred to as an Automatic Speech Recognizer or ASR) for attempting to convert audible input (e.g., speech) to recognized text. It will be appreciated by those skilled in the art and others that a typical speech recognition system 110 operates by accessing audio data through a microphone/sound-card combination, processing the audio data using a front-end signal processing module to generate feature vectors, and subsequently doing pattern-matching in a search module using knowledge from acoustic-model(s) and language-model(s). The system itself may exist as software or may be implemented on a computing device; and thus may include memory (ROM, RAM, etc.), storage, processors (fixed-point, floating-point, etc.), interface ports, and other hardware components.

In various implementations, the system 100 may operate by (a) having the ASR system 110 configured in an always-listening configuration, a partially-listening configuration, or a push-to-speak configuration, (b) accessing letters/characters from any of the input modes (101-107), (c) mitigating any noise generated by the non-speech modes (102-107) using software-signals to the ASR system 110 and/or signal processing to filter noise, (d) reducing the system's base application vocabulary dynamically into sub-set (including sub of sub-sets and sub-sub-sub-sets etc) vocabularies to significantly increase recognition accuracies and to permit practical real-time implementation of the overall system (optional), (e) handling the sub-set vocabularies using user-interface designs in standard text-input systems (optional), and (f) dynamically interacting one or more of the modes (101-107) with the ASR module.

Those skilled in the art will appreciate that the system 100 may be applied to any application requiring text-input, including (but not limited to) mobile text-messaging (SMS, MMS, Email, Instant Messaging), mobile search, mobile music download, mobile calendar/task entry, mobile navigation, and similar applications on other machines like the Personal Digital Assistants, PCs, Laptops, Automobile-Telematics systems, Accessible Technology systems etc. Additionally, several implementations of the system including a client-only, a server-only, and client-server architecture may be employed for realizing the system.

FIG. 1B illustrates in greater detail the ASR engine introduced above in FIG. 1A. In operation, the user speaks through a microphone. The speech samples are digitized and processed using signal processing (as in Linear Prediction or Cepstrum or Mel Cepstrum etc) and front-end features are generated. These are fed to the Search module wherein a dynamic programming search is carried out using knowledge from acoustic models and language models; the later may be implemented as finite state grammars or statistical language models. In the proposed invention (a multimodal system), the difference is that the language model has an additional input from other modes. Thus the language models are dynamically adapted based on inputs from other inputs. For example if a user speaks Meeting and also has typed or types "M", then the knowledge that the word begins with "M" is passed on to the language model. In practice, one may envision implementing this by modifying the Search module directly instead of changing the language models. Further, for certain applications, one could use the inputs from other modes to adapt the acoustic models (including template based models as used in speaker dependent ASR systems) and/or the signal processing algorithms.

Figure 2A:
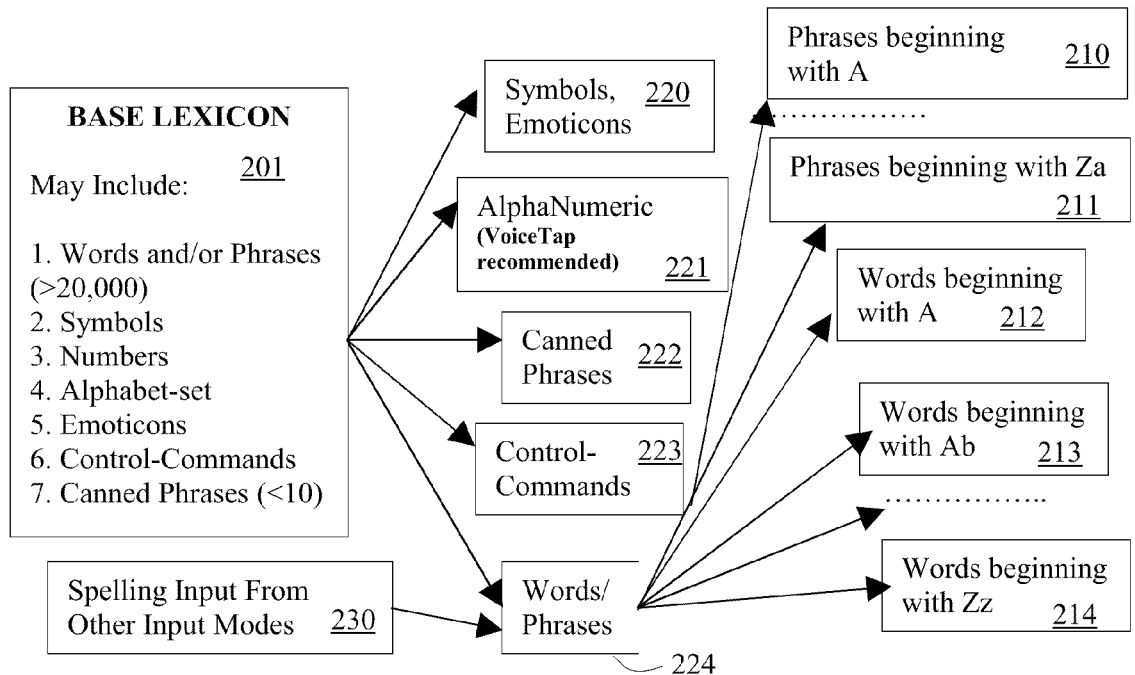
FIG. 2A illustrates one embodiment of a method for dividing a large base vocabulary into small sub-set vocabularies for building sub-set acoustic networks.

FIG. 2A illustrates a method 200 for dividing a base lexicon 201 into smaller sub-set (including sub of sub-sets and sub-sub-sub-sets etc) lexicons (210-214). Extensions to ambiguous inputs may be easily addressed. The base lexicon 201 may include any one or more of words and/or phrases (perhaps in excess of 20,000), symbols, numbers, an alphabet set, emoticons, control commands, and/or canned phrases (generally, but not always, less than 10). In FIG. 2A, the base lexicon 201 (including pronunciations) is divided into the small sub-set lexicons (201-214) including sub-set acoustic networks (those skilled in speech recognition will appreciate that different forms of acoustic networks may be designed with the basic principle being to break down words into their sub-word representations, as in phonetic pronunciations or syllables etc, and if required combine that with certain rules, "grammars", or statistics, "language models") which are compiled either prior to system launch or dynamically during system's run-time; those skilled in art will further recognize that compiling grammars for grammar-based systems are fairly straightforward whereas in speech-to-text systems the networks are dynamically compiled on the fly based on language model caching and using fast-match and detailed-match techniques. For example a base system vocabulary of 20,000 words plus 30 symbols plus 26 alphabet-letters plus 9 digits plus some commands may be broken down first into sub-set vocabularies where symbols, alphanumeric, commands, and words form the sub-sets. Each sub-set may be further broken into sub-sub-set. For instance the 20,000 words sub-set may be broken down into sub-sub-sets such that words beginning with "A", "B", and so on form the sub-sub-sets. Specific details on this may be found in the "Predictive Speech-to-Text" patent filed earlier by the inventors. The method 200 improves over other attempts at multimodal input because other attempts try to use the base vocabulary "as is", which causes those systems to fail to deliver acceptable performance.

Firstly, the small sub-set acoustic networks (equivalent to sub-set lexicons) (201-214), may be either pre-compiled during system design or may be compiled during system start-up or may be dynamically compiled at system run-time (referencing to either using grammar based ASR systems or statistical language model based speech-to-text systems). Obviously, pre-compiling results in lowest processing requirements at run-time with highest memory requirements while building at run-time results in highest processing requirements at run-time with lowest memory requirements. Whatever the implementation, having the sub-set networks yield in real-time practical systems, and additionally they significantly increase speech recognition accuracy. For instance, instead of recognizing against 20,000 words and 30 symbols and 26 alphabet-letters and 9 digits and some commands all at the same time, the system 100 may be recognizing around 300 words (because of knowledge that only words beginning with the two letters indicated by other modes are valid), 30 symbols, 26 VoiceTap-alphabet, 9 VoiceTap-digits and some commands. Alternatively, if the symbols, alphabet, digits, commands, phrases etc separated into sub-set lexicons (similar to the way they may be broken down into multiple functions in mobile devices) and subsequently into separate speech recognition states, the system 100 may be recognizing only 300 words or only 50 phrases or only symbols or only letters and digits or only commands. The method 200 may be modified using minor modifications depending on the overlap between the states; for instance if letters and symbols are desired to be combined into a single state, then an "Insert" key-command may be added to symbols to distinguish them from letters. The sub-set lexicons (210-214) may themselves include Phrases or other Text.

In addition, observe that the method 200 also receives input from other input modes 230 (which may be a speech mode) to enable it to reduce the base lexicon 201 into sub-set lexicons (210-214). It is further emphasized that the inputs from the other input modes 230 may include ambiguous inputs (as is common in 9-digit keypad inputs), mis-typed inputs, mis-recognized voice inputs (when using ASR designed for spoken alphabet or military alphabet coding or VoiceTap coding recognition).

Figure 2B:
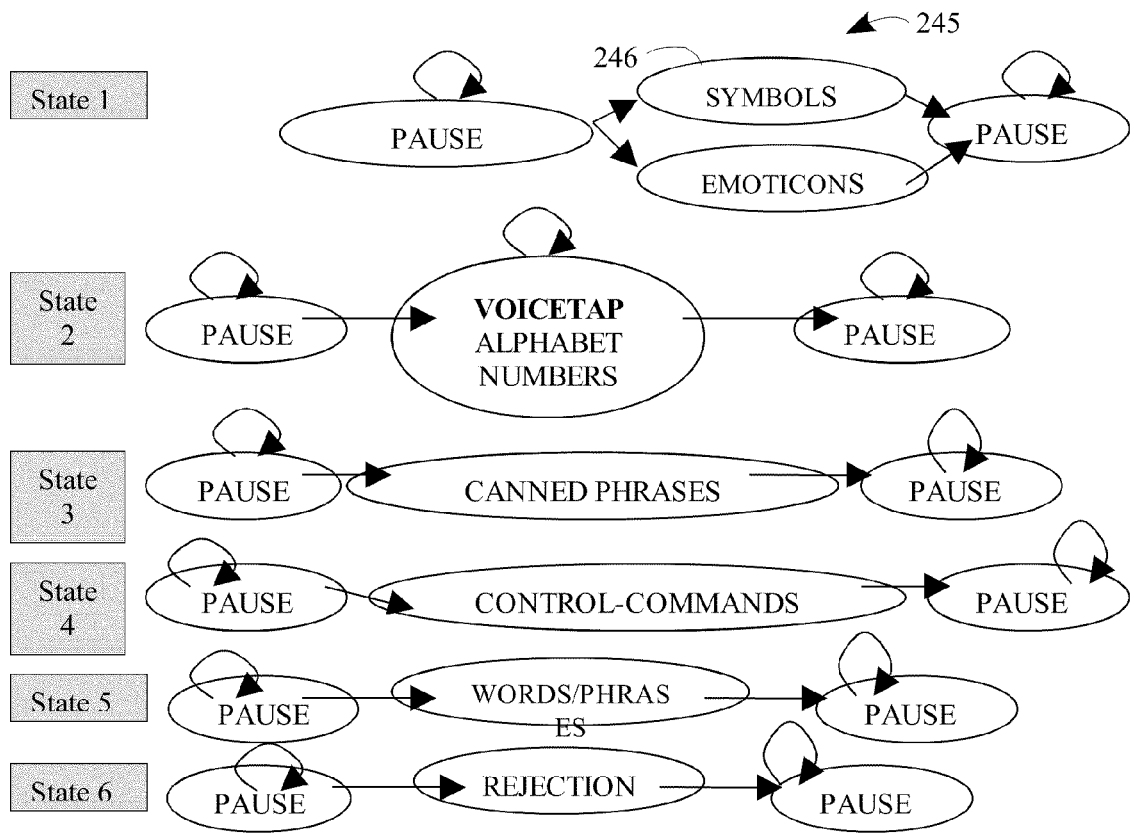
FIG. 2B illustrates an example of the word-graph state-machine.

FIG. 2B illustrates a finite state-machine search network (at the word-level). Those skilled in art will realize that, in practice, the final network would include phonemes as determined by the pronunciations of the words and that the figure is a general representation for both fixed-grammar based ASR systems and statistical language model based dictation or speech-to-text systems. As shown in the word-graph state machine 245, the system 100 moves from a one state to some other state using a manual control. The system 100 detects and keeps track of the states. The states may be manually selected by users using buttons on keypad and/or the states may be combined and selected automatically using voice command-controls. In the later case, knowledge of state may be easily detected based on best-matching recognition output and may be used to post-process the ASR engine's 110 recognition output. For instance if a best-matching hypothesis belonged to the state "symbol" 246 then only those alternatives belonging to this state (symbol 246) are displayed in an N-Best choice window. Thus if the user said "Insert Semicolon" the system 100 will only display alternative symbols as choices.

Figure 2C:
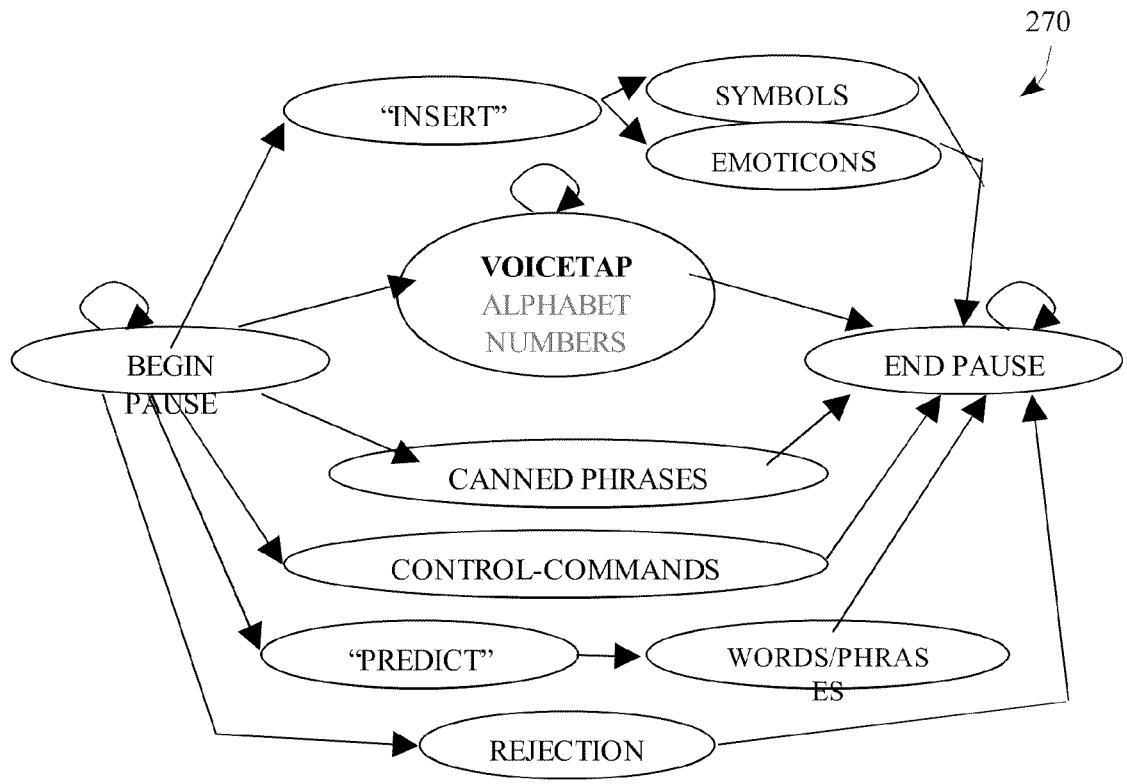
FIG. 2C shows another example of word-graph state-machine.
Figure 2D:
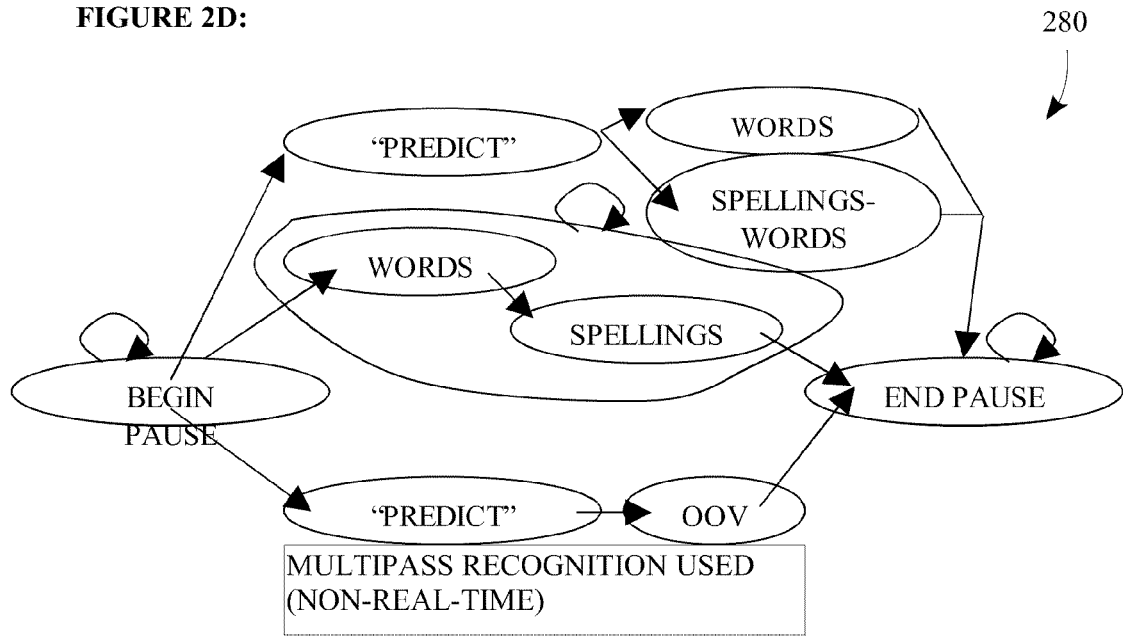
FIG. 2D shows example of variations of word-graph state-machine for Words shown in FIG. 2C

FIGS. 2C and 2D illustrate additional word-graph state machines (270, 280). FIG. 2C illustrates a word-graph state machine 270 based on using voice commands, and FIG. 2D illustrates a variation 280 of the word-graph state machine 270. For instance in FIG. 2C a state machine for implementing a handsfree system is shown wherein an "Insert" keyword is used for symbols and emoticons, a "Predict" keyword is used for words while the remaining states have no keywords. In FIG. 2D another state machine for handsfree implementation is shown wherein some of the words have a user-interface option of speaking-and-spelling the words, some words have the option to insert a keyword whereas other words are simply recognized using an out-of-vocabulary (OOV) rejection scheme (well-known in ASR systems for word-spotting) and multipass recognition is resorted to.

Figure 2E:
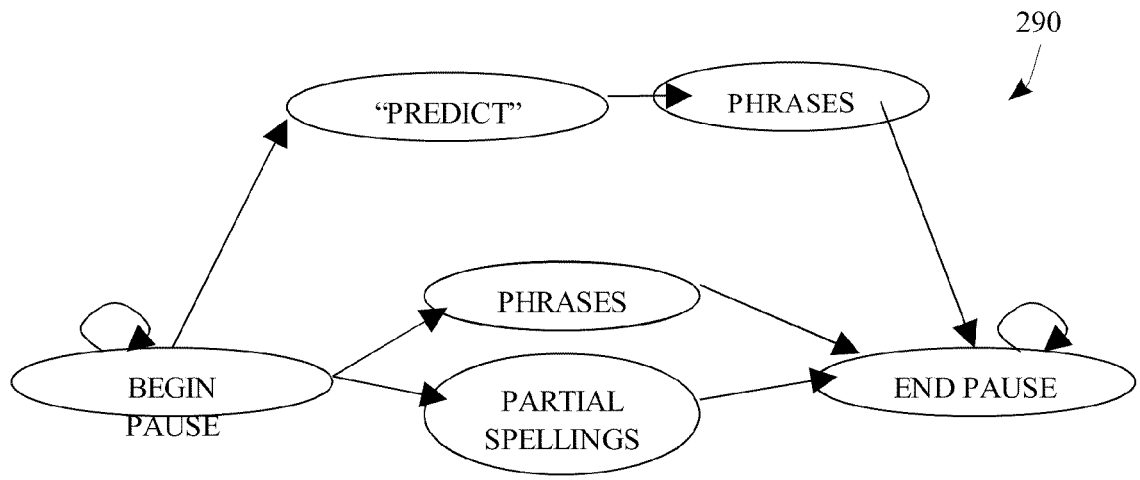
FIG. 2E shows possible variations in the state-machine of FIG. 2C.

FIG. 2E illustrates an additional word-graph state machine 290 for phrases. Here, a user could say "Predict" followed by a Phrase or simply a phrase or actually spell the entire phrase.

Those skilled in art will appreciate that other variations of word-graphs may also be obtained, including (but not limited to) (a) using partial spellings, (b) using speak-and-partially-spell mode, (c) using a hybrid scheme wherein users spell as in "Predict W O R D" for short words and say "Predict Word" when the word is long, and (d) using finer categorization like "Predict COLOR Yellow" or "Predict CITY Boston" or "Predict WEB ADDRESS Google-dot-com" or "Predict PHRASE Where are you" or "Predict BUSINESS Document" or "Predict ROMANCE Missing" etc.

Figure 2F:
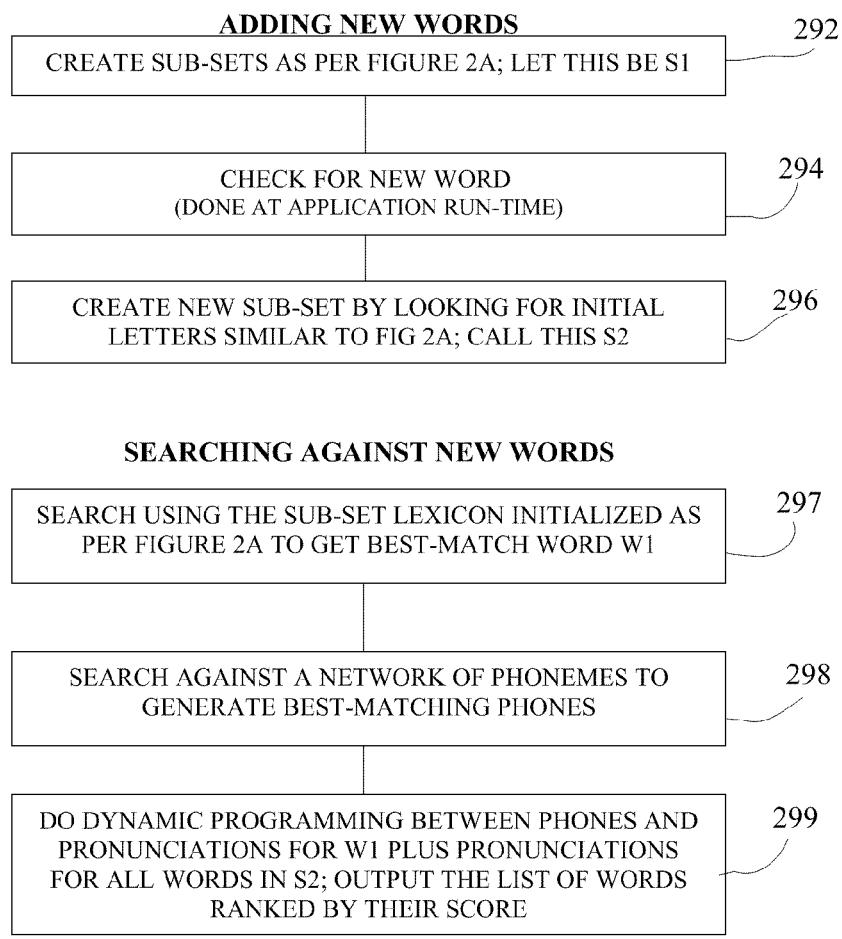
FIG. 2F: Method for adding and searching new words to system.

Finally, a word-graph may be adapted based on the user's behavior, frequently used words/phrases, corrected words etc. One simple way to add new words is to simply add/remove the words and their pronunciations from the sub-set vocabularies or sub-set acoustic networks. This is fairly well-known art in ASR systems. Alternatively, another scheme is described in FIG. 2F for adding new words not in the base lexicon 201 and searching for the same. To add a new word, first the system 100 creates the initial sub-set lexicons (210-214) as illustrated in FIG. 2A (step 292). The initial sub-set lexicons (210-214) will be referred to as S1. Next, the system 100 receives a new word from a user, such as through manual input or the like, and the system 100 checks S1 for the new word (step 294). Not finding the new word, the system 100 creates a new sub-set lexicon based on the initial letter(s) of the new word. This new sub-set lexicon is referred to as S2.

To search for new words, the system searches the sub-set lexicon S1 to get a best-match word, referred to as W1 (step 297). The system 100 also searches against a network of phonemes to generate the best-matching phones (step 298). Then, the system 100 performs dynamic programming between phones and pronunciations for W1 plus pronunciations for all words in S2 (step 299). The list of resulting words may be output ranked by their respective scores.

Other standard techniques for adding words and their pronunciations to existing sub-set lexicons may be also included. For example, a modification of the state-machine from FIG. 2C that includes an additional Phoneme-network path is shown in FIG. 2G.

Figure 3B:
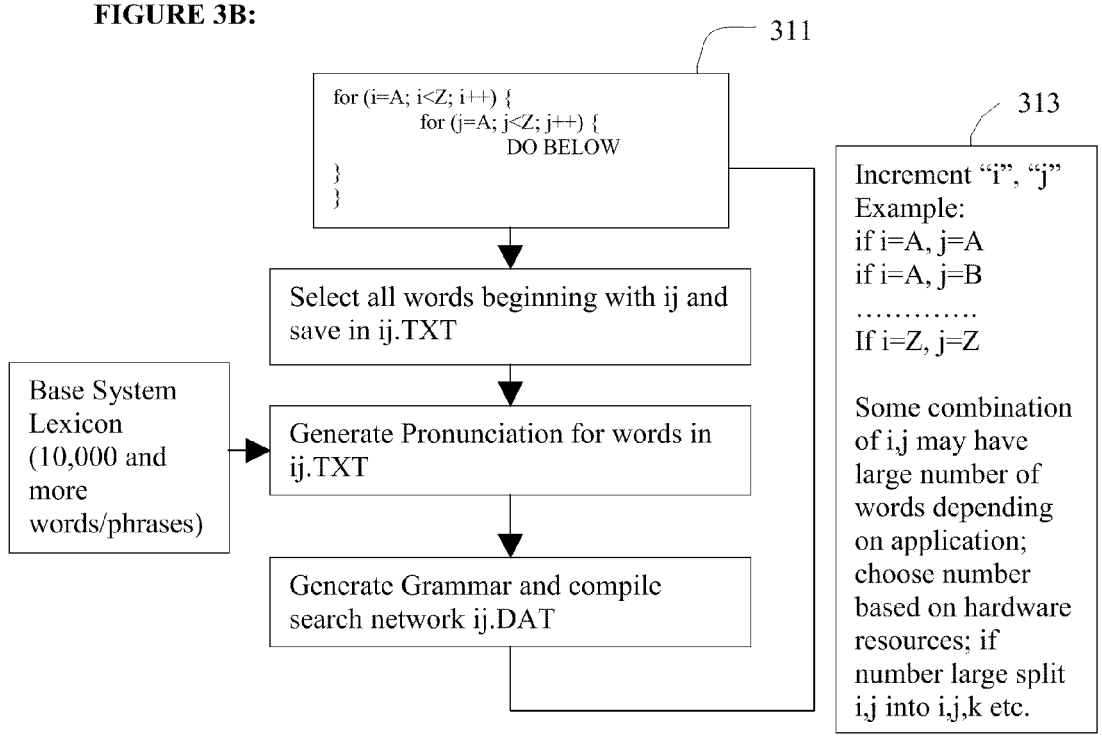
FIG. 3B illustrates another embodiment of the algorithms for generating sub-set lexicons and search networks.

An example algorithm for generating the sub-set lexicons is provided in FIGS. 3A and 3B. FIG. 3A illustrates the case where a lexicon is being created based on a single letter being known, while FIG. 3B illustrates the case where a lexicon is being created based on a given combination of two (or more) characters. As shown in FIG. 3A, the process begins by initializing a variable "i" to some initial value, such as the letter "A" (block 301). Words from the base system lexicon that begin with the letter represented by "i" are added to a text file having a name of i.TXT, where the letter "i" represents the currently selected letter value (e.g., "A" currently) (block 303). At this point, the variable "i" is incremented to the next possible value, e.g., the next letter in the alphabet sequence, and the process repeats (block 305). The process runs again and continues to repeat until a different pre-compiled search network has been created for every possible value of "i".

As shown in FIG. 3B, a similar process is performed except that more search networks are created based on two-letter strings. Accordingly, the process illustrated in FIG. 3B differs from the process in FIG. 3A in that two variables "i" and "j" are used (block 311), and those variables are individually incremented (block 313) until the possible combinations of search networks have been generated.

Observe that for the first set (FIG. 3A), the most common words are used based on what is commonly referred to as n-gram statistics in language modeling. This is because if the system vocabulary is 26,000 words there is all possibility that each list will on an average be 1000 words. Many devices do not have the processing power to search an active list of 1000 words. Even if they do, the confusion between words reduces the recognition accuracy. Experiments conducted by the inventors have revealed that 200 words is a good limit for many practical applications.

For the second set (FIG. 3B), combination of the 1st and 2nd characters are used to create the words. In this case, most of the combinations have words less than 200. If they are more than 200, once again n-gram counts may be used to select the top 200 words and the rest may be split into 3-character lists or other techniques may be incorporated. Obviously, the actual process may be run off-line (on a PC or other machine) and the final search-network files may be packaged into a single data-structure. Alternatively, if the networks are being dynamically built then only words and pronunciations may be stored and cached at run-time to build the actual networks.

Several extensions to the above are possible. For instance, based on the frequency of usage of words by the user (also referred to as dynamic statistical language modeling) the words from 3-letter lists may be moved into 2-letter lists and subsequently to 1-letter lists and finally to a list that does not require any letter input, meaning pure speech-to-text; and vice-versa. For instance if the word "consequence" was included in the con.dat search network because its unigram count for English language is low and a user begins using the word "consequence", then "consequence" may be moved to co.dat and further up to c.dat and so on and finally be the word in the main recognition pass. Similarly if "although" is word in a.dat and not being used then it could be moved to al.dat and alt.dat and so on. For speech-to-text systems, the statistical language models may be adapted in a similar fashion and cached at run-time based on additional language model knowledge of the spelling of the words.

Several other extensions are possible for selecting words. For instance a combination of longer and more frequent words may be grouped together and using the so-called confusion matrix (well-known in speech recognition) the top 200 words may be selected.

Additional information on this feature may be obtained from currently-pending U.S. patent application Ser. No. 11/941,910, which is hereby incorporated by reference in its entirety for all purposes. Those skilled in the art will appreciate that a variety of other techniques may alternatively be used for this step.

Figure 3C:
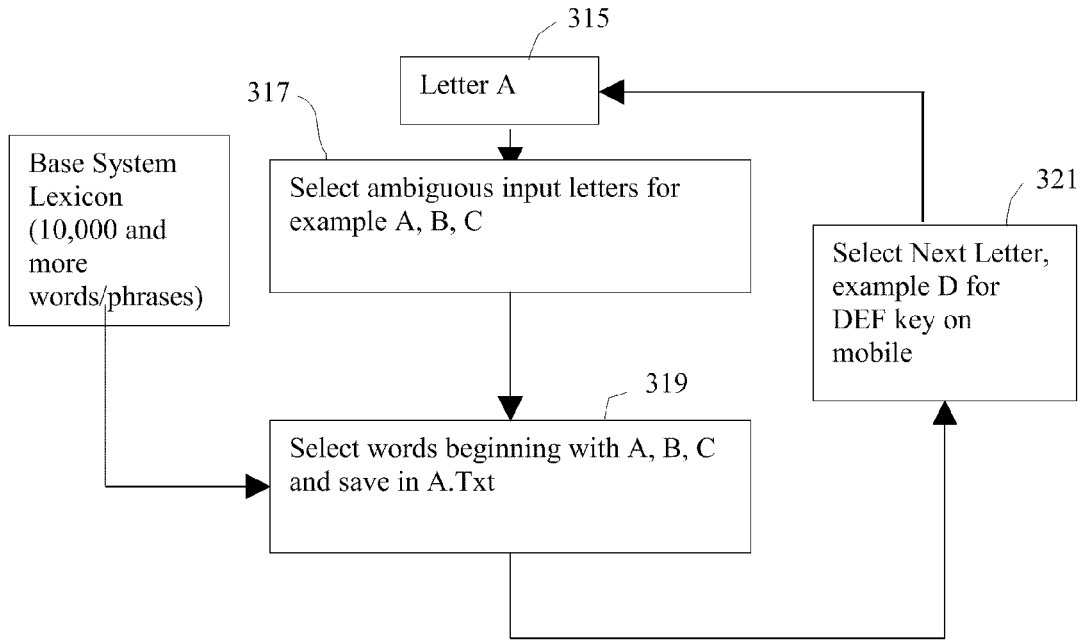
FIG. 3C: One embodiment of algorithm for generating sub-set lexicons for ambiguous inputs as in a 9-digit mobile phone.

FIG. 3C illustrates an alternative method for generating sub-set lexicons for ambiguous inputs, such as would be generated by the 9-key keypad of most mobile phones. As shown, when the system assumes that sub-set lexicons may be generated in accordance with the ordinary letter-groupings of the common 9-key keypad. For example, the three letters A, B, and C may all be associated with the same key on the keypad. Thus, beginning with the letter A (step 315), each of the ambiguous letters that are associated with the letter A are identified (e.g., A, B, and C) (step 317). Next, the words from the base lexicon that begin with all of the identified ambiguous letters are grouped and saved in a sub-set lexicon for the key letter "A" (step 319). The next letter in the series (e.g., the letter D since the letters A-C are grouped) is selected and the method repeats (step 321). The method continues until completion.

FIGS. 4A-E display different embodiments of the proposed system for different tasks including symbols, words, and phrases. First, in FIG. 4A, a method is shown for predicting the word "meeting". First, the user speaks the word "meeting" (step 401). The system waits for a key-press event (or other input mode event) to activate a state (step 402). Until the user presses any letter key, the system waits (step 404). When the user presses a letter key, the system activates the ASR engine with the new lexicon (step 405). In this example, the first pressed letter would be the letter M, thus the new lexicon is the sub-set lexicon associated with the letter M. Using that lexicon, the system recognizes using stored features which may be the waveform or traditional ASR front-end features, such as in Cepstrum. Since the recognition in this example is not real-time, utterance detection may be employed to increase recognition speeds. Example output may be "minute", "meeting", or "me".

The N-best results may be post-processed (step 407) to rearrange the N-best words such that their initial letters are "mee". Additional inputs are received from the user (step 408) until the correct word is recognized, and the result is then displayed (step 409).

Figure 4A:
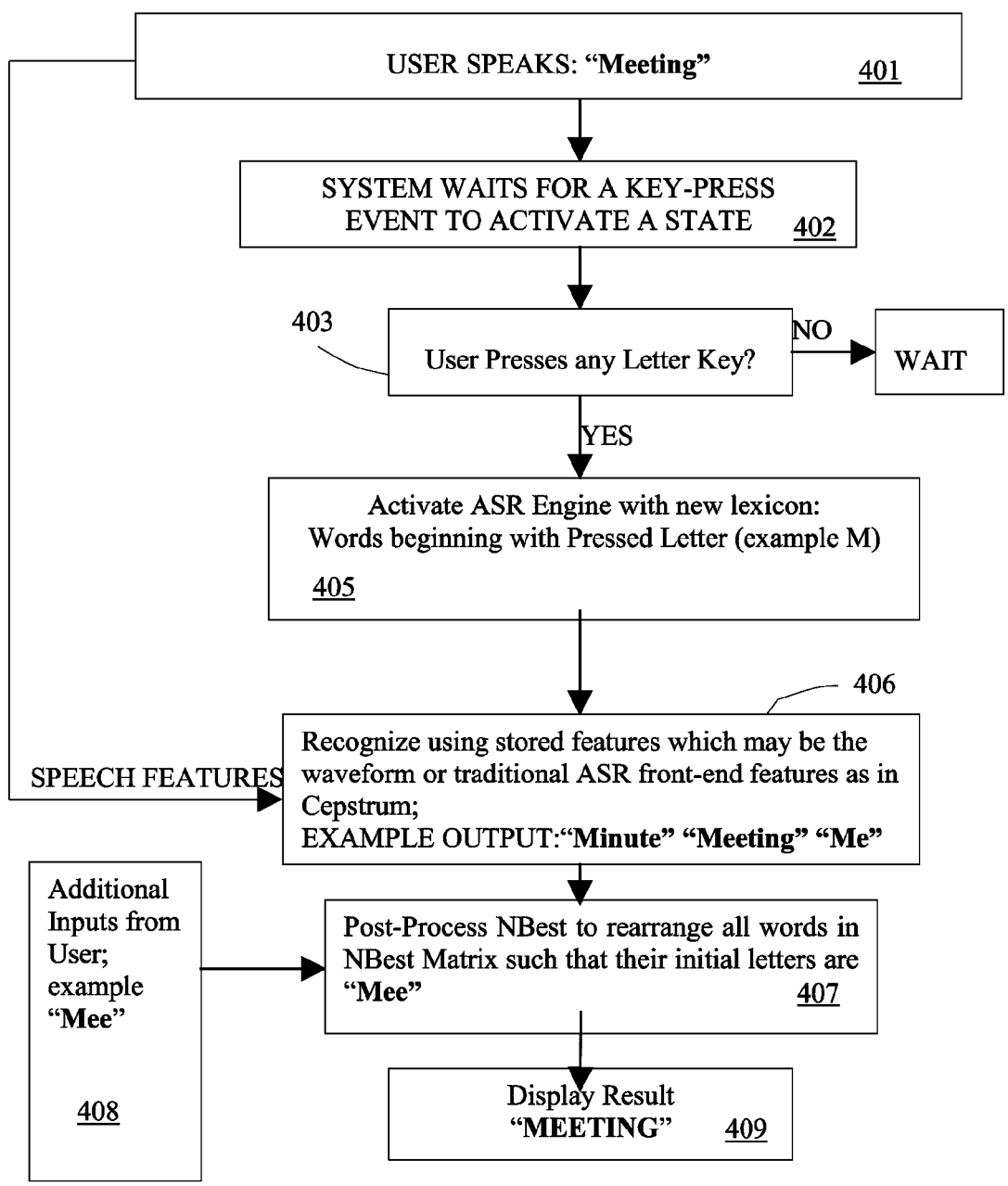
FIG. 4A: one embodiment of system in FIG. 2A for predicting words.
Figure 4B:
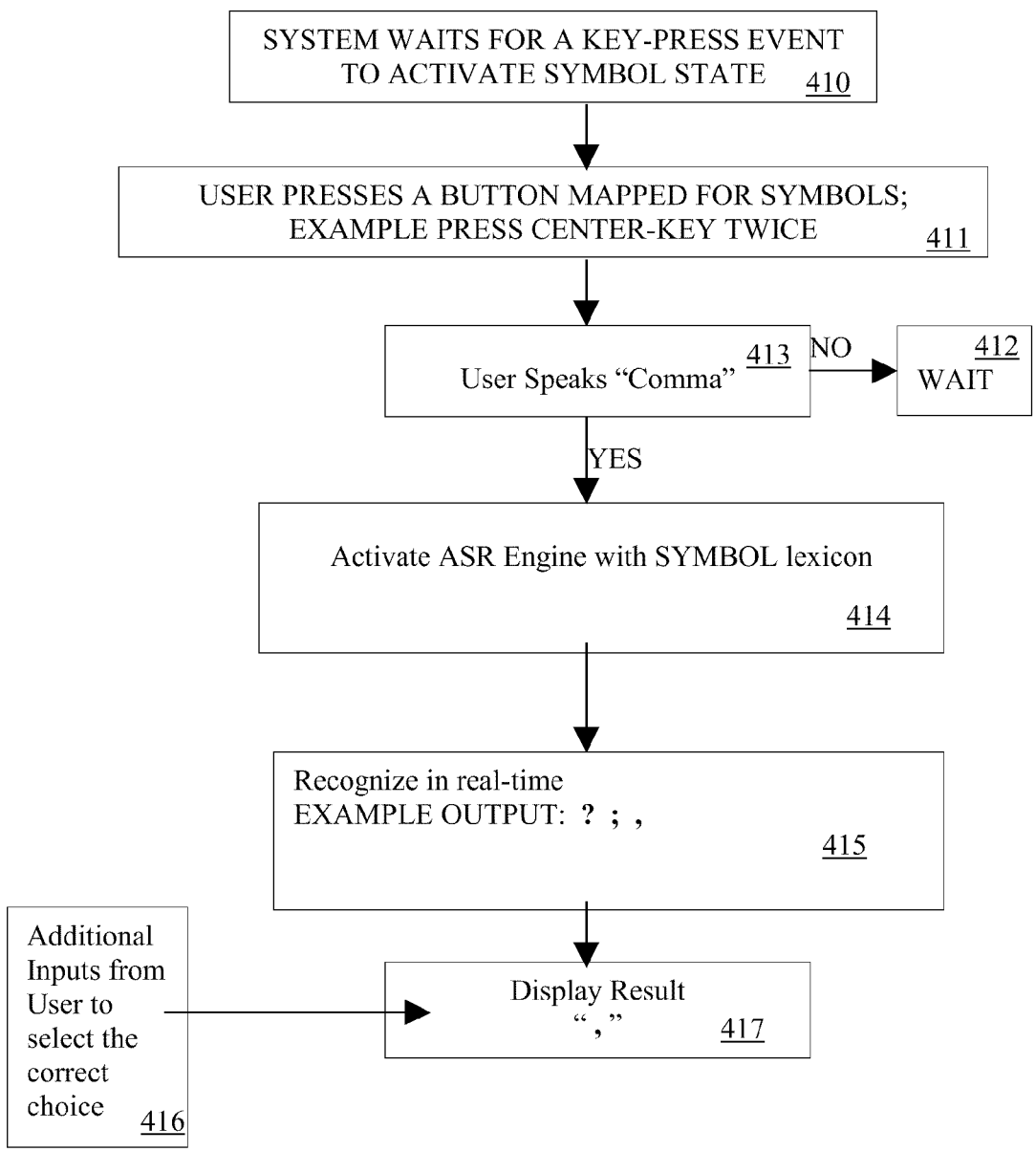
FIG. 4B: one embodiment of system in FIG. 2A for predicting symbols.

FIG. 4B illustrates an example method for predicting the comma symbol ",". The system waits for a key-press event to move to the symbol state (step 410). When the user presses a button mapped to the symbols state, the system moves to that state (step 411). For example, the user may press the center key twice to indicate that a symbol is desired. The system then waits (step 412) until the user speaks the word "comma" (step 413), at which point the system activates the ASR engine with the symbol sub-set lexicon (step 414). The ASR engine then recognizes the waveform in real-time (step 415). Additional inputs from the user may be received to help select the correct choice if the initial recognition selection is incorrect (step 416). The system finally displays the correct result (step 417). Those skilled in art will recognize that this example is standard technique used in ASR systems for command recognition. The difference here is that the technique is embedded in the multimodal framework and the symbol state gets activated by a manual control; after recognition of the symbol the system goes back to the default state which may be words.

Figure 4C:
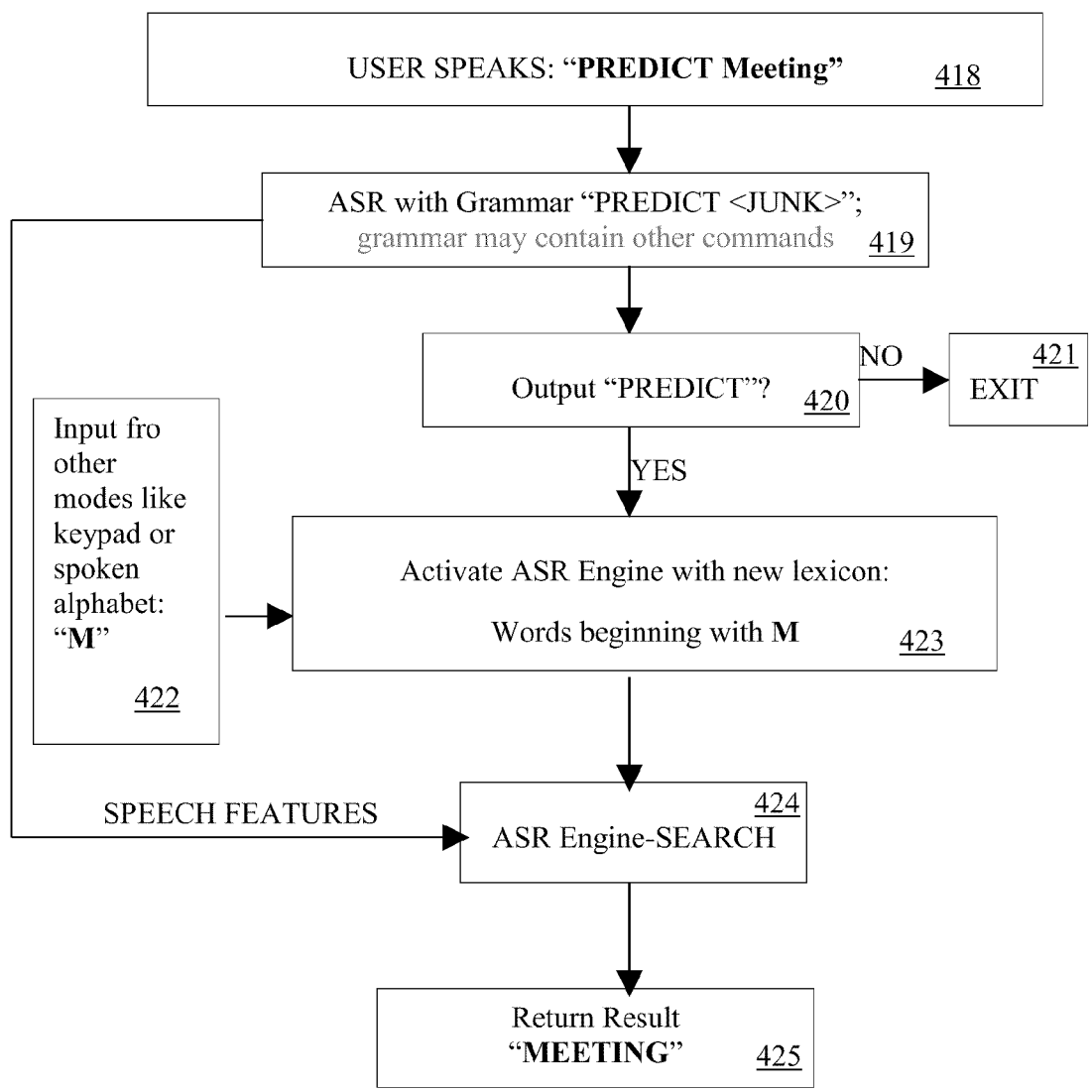
FIG. 4C: one embodiment of Algorithm for system in FIG. 2A for predicting words using voice-controls.

FIG. 4C illustrates another example method for predicting the word "meeting" with a system that uses voice controls. The method begins when the user speaks the phrase "predict meeting" (step 418). In response, the system launches the ASR engine with the grammar "predict <junk>" (step 419), where <junk> indicates a place marker for a waveform to recognize in response to the control command "predict". When the user inputs the letter M using some other input mode, such as a keypad or by speaking "M", (step 422), the system activates the ASR engine with the sub-set lexicon for words beginning with the letter M (step 423). The ASR engine then performs a recognition on the waveform identified by <junk> using the sub-set lexicon (step 424). The system then returns the result "meeting".

Figure 4D:
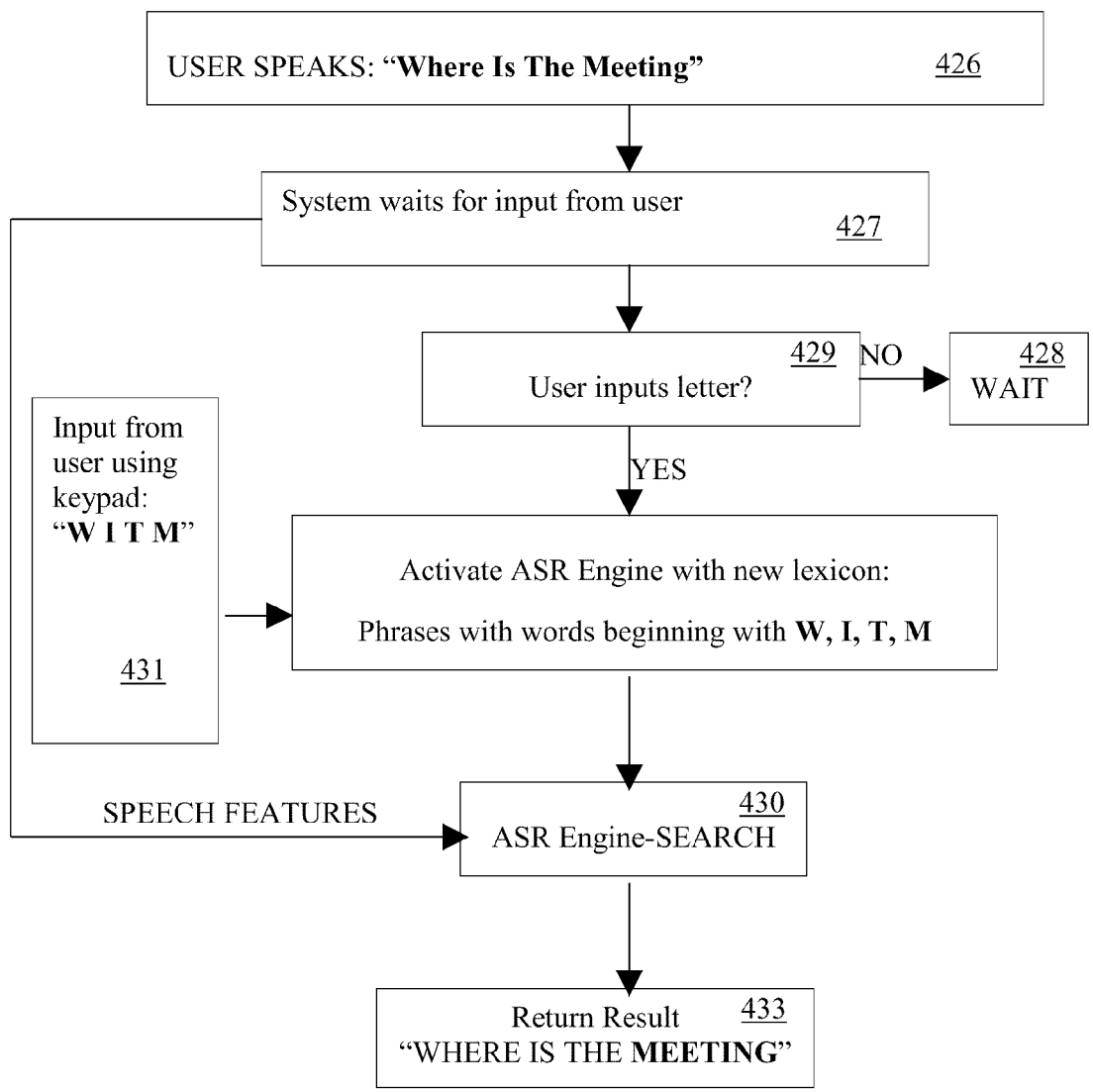
FIG. 4D: one embodiment of system in FIG. 2A for predicting phrases.

FIG. 4D illustrates an example method for predicting phrases. To begin, the user speaks the phrase "where is the meeting" (step 426). The system waits for input from the user (steps 427, 428) until the user inputs a letter (step 429). In response, the system activates the ASR engine with the sub-set lexicon based on the letter received from the user (step 430). The system receives more input from the user (step 431) and continues to refine the search operation. In this example, the system recognizes phrases based on the initial letters of each word in the phrase (W, I, T, M). The ASR engine continues to recognize (step 432) until the appropriate phrase is identified, and the results are returned (step 433).

Figure 4E:
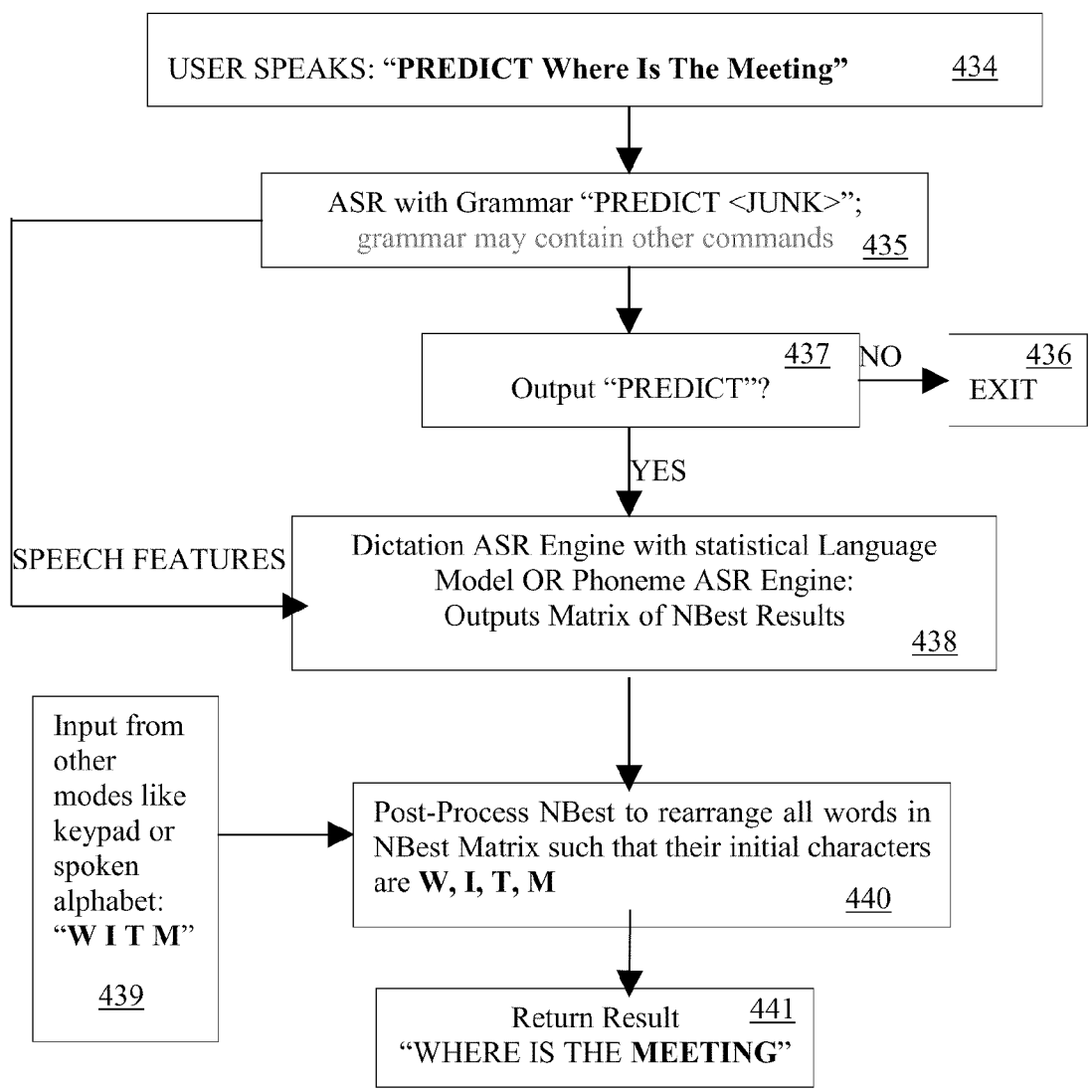
FIG. 4E: another embodiment of Algorithm for system in FIG. 4D for predicting phrases.

FIG. 4E illustrates another example method for predicting phrases. To begin, the user speaks the phrase "predict where is the meeting" (step 434). The system initiates the ASR engine with the grammar "predict <junk>" (step 435), where <junk> indicates a place marker for a waveform to recognize in response to the control command "predict". The system launches the ASR engine (step 438) with a statistical language model or phoneme. The ASR engine outputs a matrix of N-best results. The user provides additional input using other input modes, such as the letters W, I, T, and M (step 439). The system post-processes the N-best list to rearrange the words such that their initial letters are W, I, T, and M (step 440). With that input, the system recognizes and returns the result "where is the meeting" (step 441).

Figure 5A:
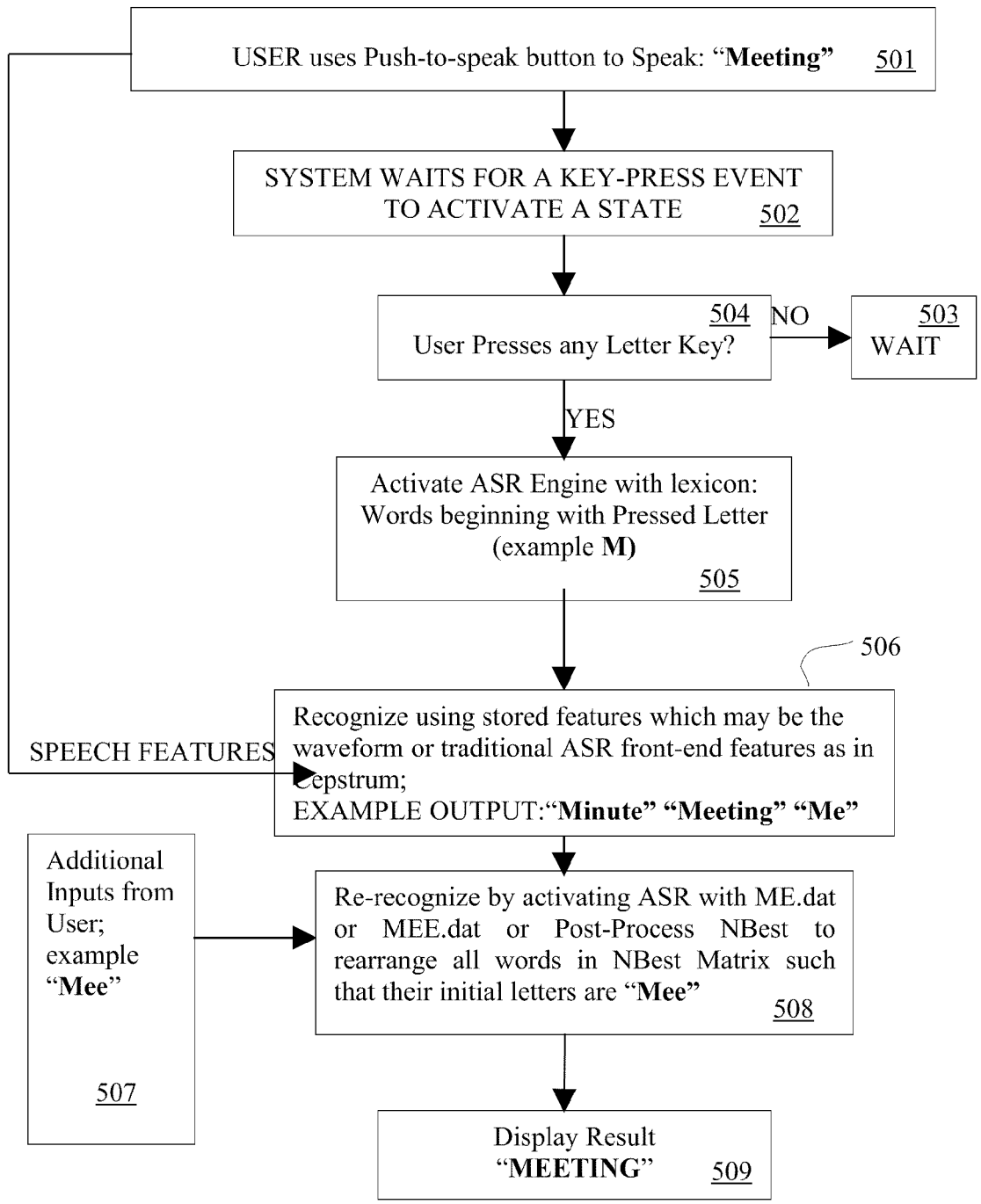
FIG. 5A: a system in FIG. 2A using push-to-speak configuration; example of speak-and-type user-interface is considered.
Figure 5B:
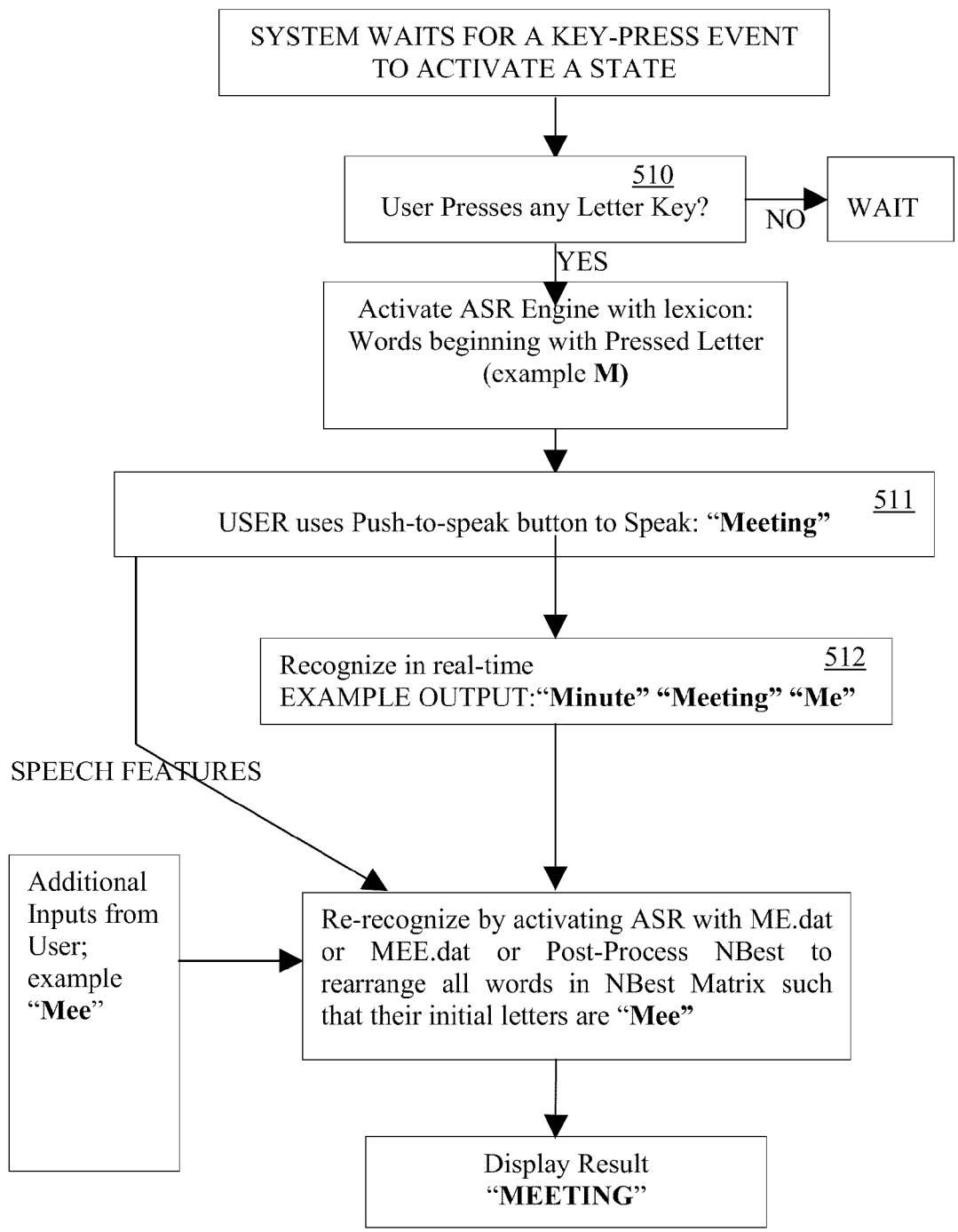
FIG. 5B: a system in FIG. 2A using push-to-speak configuration; example of type-and-speak user-interface is considered.
Figure 5C:
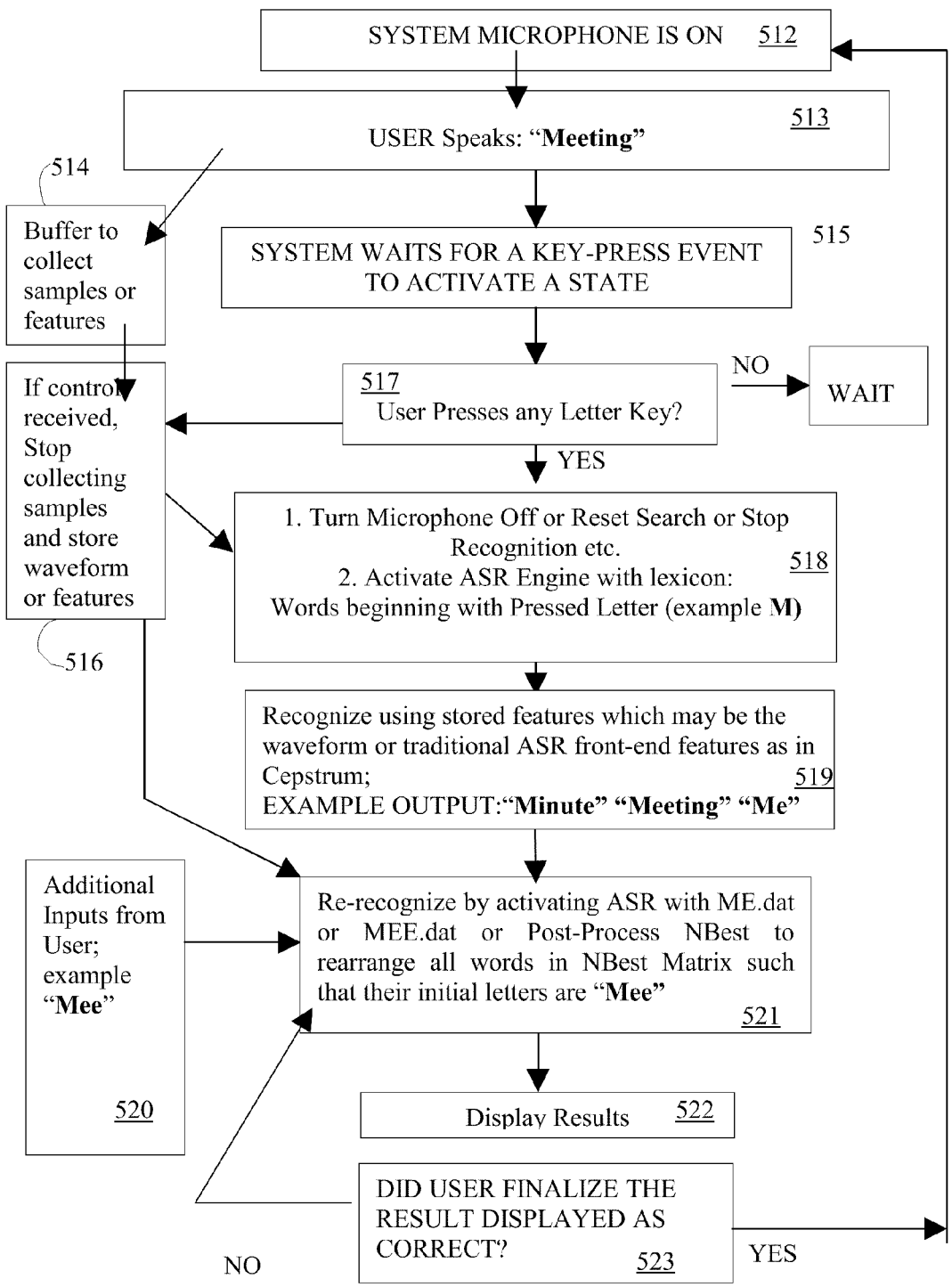
FIG. 5C: a system in FIG. 2A using partial-listening configuration using speak-and-type user-interface
Figure 5E:
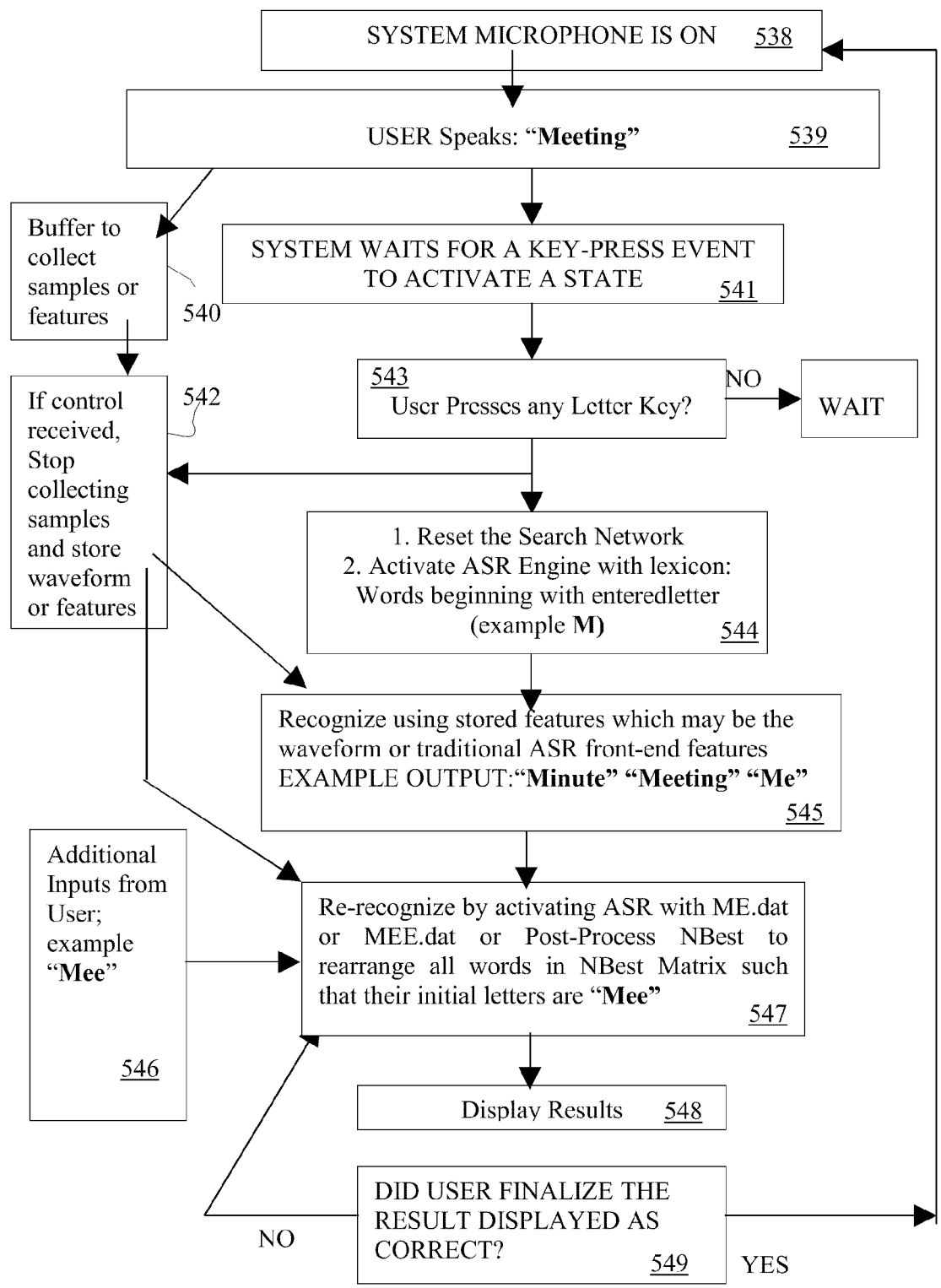
FIG. 5E: a system in FIG. 2A using always-listening configuration using speak-and-type user-interface.

In FIGS. 5A-E, different methods that implement the system in different embodiments are illustrated in detail. This includes Push-to-Speak configuration (FIGS. 5A and 5B), Partial Listening configuration (FIGS. 5C and 5D), and Always Listening configuration (FIGS. 5E and 5F). The push-to-speak configuration implies either holding down a key while speaking; or pressing a key, speaking, and pressing the key again; or pressing a key to activate and end-of-speech is automatically detected. They may be selected based on user preference, hardware limitations, and background noise conditions.

In FIG. 5A, the user presses a "push-to-speak" button and speaks "meeting" (step 501). The system waits for a key-press event to activate a state (step 502/503). When the user presses a letter key (step 504), the system activates the ASR engine with the sub-set lexicon for words beginning with the pressed letter (step 505). The ASR engine recognizes using stored speech features which may be the waveform or traditional ASR front-end features, such as in Cepstrum (step 506). As the user provides additional input letters (step 507), the system re-recognizes by activating the ASR engine with the new sub-set lexicon based on the additional input letters, or by post-processing the N-best list using the additional input letters (step 508). This method continues until the proper result is recognized and displayed (step 509).

The method illustrated in FIG. 5B performs as described in FIG. 5A, except that the user presses input keys to input letters (step 510) prior to pressing a push-to-speak button and speaking the word "meeting" (step 511). In this implementation, the system can begin recognizing the waveform in real-time because the sub-set lexicon will have been already selected based on the prior letter input.

In FIG. 5C, the system microphone is initially on (step 512) when the user speaks "meeting" (step 513). The system buffers the spoken text (step 514) and waits for a key-press event to activate a state (step 515). If a control command (for instance any letter key) is received, the system stops collecting samples and stores the waveform or features for processing (step 516). Additionally, when the user presses a letter key (step 517), the system turns the microphone off or resets the search or stops recognizing etc. and activates the ASR engine with the appropriate sub-set lexicon (step 518). The system recognizes using the stored features which may be the waveform or traditional ASR front-end features, as in Cepstrum (step 519). As the user provides additional input letters (step 520), the system re-recognizes by activating the ASR engine with the new sub-set lexicon based on the additional input letters, or by post-processing the N-best list using the additional input letters (step 521). This method continues until the proper result is recognized and displayed (step 522). The user may be prompted to indicate that the displayed results are correct (step 523). If the results were incorrect, the method repeats (step 521) until the correct results are identified.

In FIG. 5D, the user types the letter "M" (step 524). At this point, the system microphone is on and/or audio buffers are being collected (step 525). The buffers collect audio samples or features (step 526). The system detects a begin and end of speech, and/or waits for the next letter to be input (step 527). If a control command is received, the system stops collecting samples and stores the waveform or features (step 528). The system ultimately detects an "end of speech" condition, meaning that the user has paused or stopped making an utterance, or the user presses a key (e.g., the letter E) (step 529). At that point, the system activates the ASR engine with the appropriate lexicon, which may be a sub-set lexicon if a letter was pressed or it may be the base lexicon if an end-of-speech was detected (step 530). The ASR engine begins recognizing the stored features (step 532), or it may ignore the utterance if it is too short to recognize (step 531). As the user provides additional input letters (step 534), the system re-recognizes by activating the ASR engine with the new sub-set lexicon based on the additional input letters, or by post-processing the N-best list using the additional input letters (step 535). This method continues until the proper result is recognized and displayed (step 536). The user may be prompted to indicate that the displayed results are correct (step 537). If the results were incorrect, the method repeats (step 535) until the correct results are identified.

Other optimizations may be easily envisioned. For instance waveform collected between keystrokes may all be compared using confidence scores or other techniques and this way the system may allow a user to speak before or after or while typing a word.

In FIG. 5E, the system microphone is initially on (step 538) when the user speaks "meeting" (step 539). The system buffers the spoken text (step 540) and waits for a key-press event to activate a state (step 541). If a control command is received, the system stops collecting samples and stores the waveform or features for processing (step 542). When the user ultimately presses a letter key (step 543), the system resets the search network and activates the ASR engine with the appropriate sub-set lexicon (step 544). The system recognizes using the stored features which may be the waveform or traditional ASR front-end features, as in Cepstrum (step 545). As the user provides additional input letters (step 546), the system re-recognizes by activating the ASR engine with the new sub-set lexicon based on the additional input letters, or by post-processing the N-best list using the additional input letters (step 547). This method continues until the proper result is recognized and displayed (step 548). The user may be prompted to indicate that the displayed results are correct (step 549). If the results were incorrect, the method repeats (step 547) until the correct results are identified.

In FIG. 5F, the microphone is always on and the recognizer is continuously processing (step 550), when the user types a letter (step 551). In response, the system resets the current search network and the stored audio buffers (step 552). Until the end-of-speech is detected (step 553), the system waits (step 554). When the end-of-speech is detected, the system activates the sub-set lexicon based on the previously-typed letters (step 555). In addition, the utterance that was detected is stored for processing (step 556). If the utterance that was detected is too short for recognition, the system ignores the utterance (step 557). The system begins recognizing the utterance using the stored waveform and features (step 558). If a special key is pressed (e.g., the Delete key), the system re-recognizes by activating the ASR engine with the new sub-set lexicon based on additional input letters (step 560), or by post-processing the N-best list using the additional input letters (step 561). This method continues until the proper result is recognized and displayed (step 562). The user may be prompted to indicate that the displayed results are correct (step 563). If the results were incorrect, the method repeats (step 561) until the correct results are identified.

FIG. 5G is a table comparing the multimodal input equivalents for manual input mechanisms for achieving certain illustrative desired outputs. Note that the speech component of the multimodal system builds on-top of existing standard non-speech text-input designs, and hence may be viewed as a voice-analog to existing input methods specifically the mobile user-interface. For instance, instead of having to type 4 or 5 letters of a Contact-Name, the system invokes the user to say "Contact-Name" and begin typing as usual; because of the additional speech input the system completes the name in 1 or 2 letters as opposed to 4 or 5 letters. Overall, the user interface stays the same with an additional option to speak before or while or after typing. Other examples in the Figure refer to inputting Phrases, symbols, and words. For each one of these, the proposed system retains the existing interface and builds on top of it to provide additional options of speeding up input using speech. By having such a design it is envisioned that the overall behavioral change for the mobile user is minimum.

FIG. 5H illustrates a table comparing the multimodal input equivalents for ordinary speech recognition input mechanisms for achieving certain illustrative desired outputs. Note that other systems attempt to do "open dictation" and fail to yield desired accuracies and/or acceptable performance.

Figure 6:
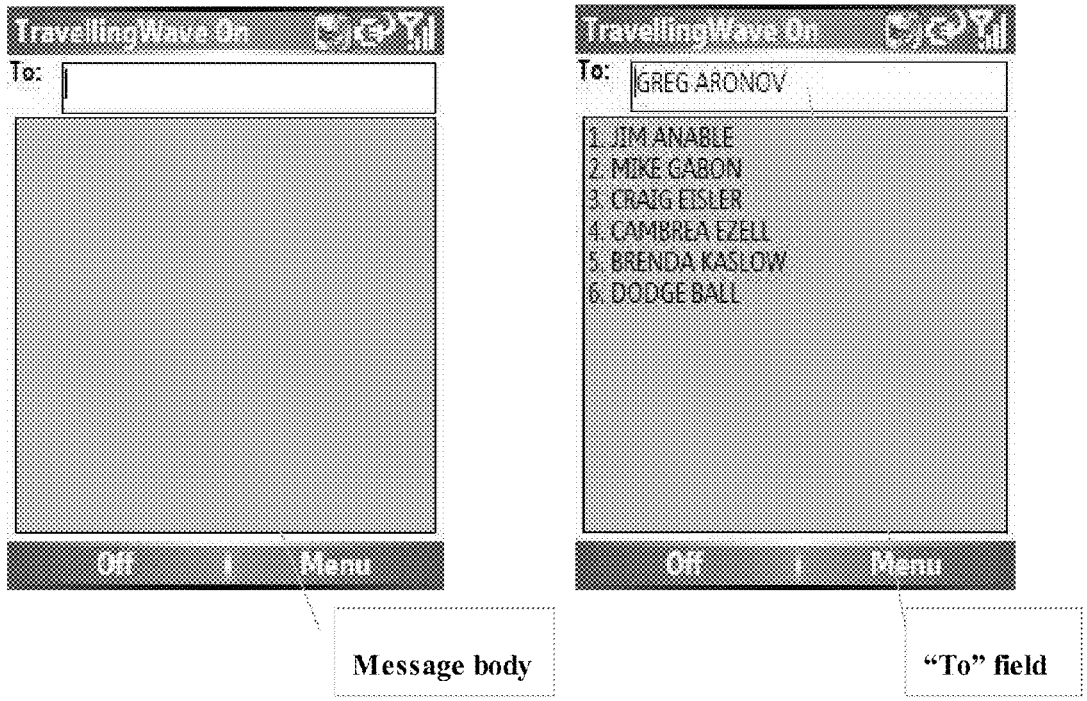
FIG. 6 illustrates an application of the invention for "text-messaging" wherein the invention is viewed as a multimodal interface along with a hands-free mode.
Figure 6:
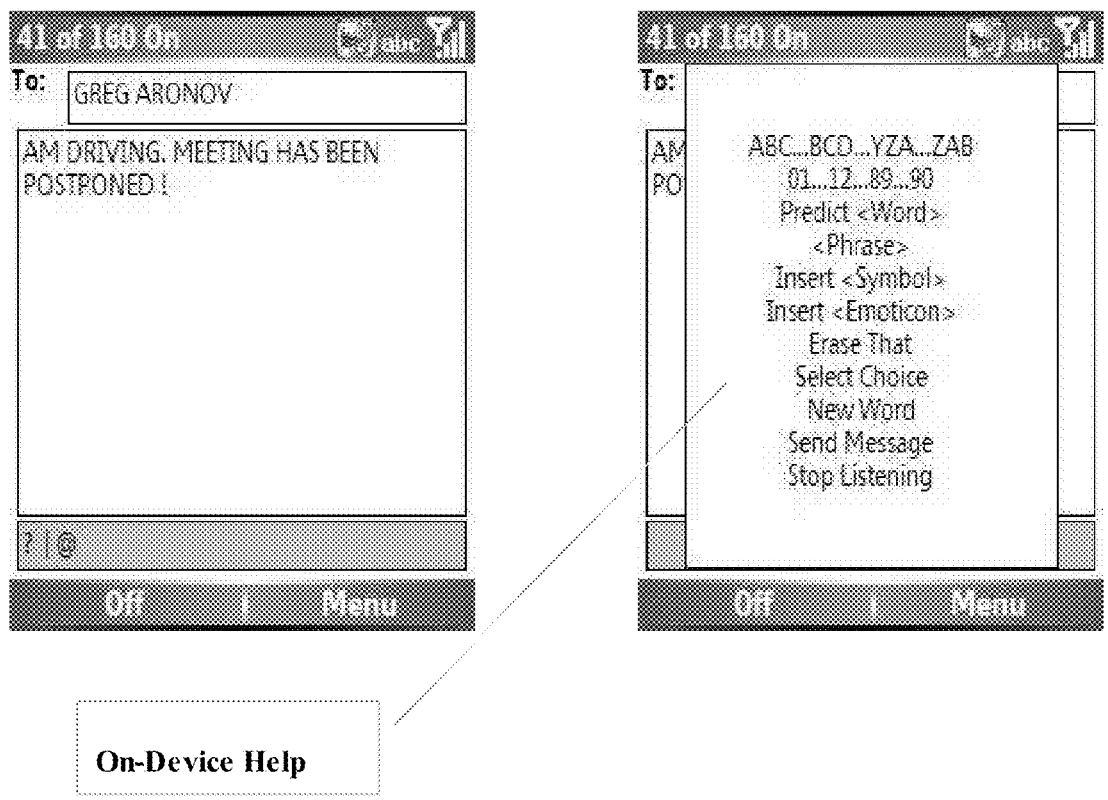

FIGS. 6A-6J illustrate an illustrative user interface that may be presented in certain embodiments. Referring to FIGS. 6A and 6B, the illustrated application may be a pre-loaded software on a device and/or may be downloaded over-the-air (OTA) by end-users. It may be launched by a simple push of a button. As shown in Figure on top right, user could say "Insert Greg Aronov" or alternatively use a multimodal method: type in "G" and then say "Insert Greg Aronov". Notice that the TO: field may be changed to have a general purpose address field to address multiple applications like Text-Messaging, Mobile-Search, and Navigation etc. For instance, one could envision saying "Insert GOOGLE DOT COM" followed by "Begin Search" to simply modify the user-interface for Mobile-Internet-Browsing. The Message body may then be viewed as a "WINDOW" to enter search related queries.

Referring to FIGS. 6C and 6D, The ON-DEVICE help shown may also include help for other modes like a help for the popular T9 input method and/or the triple-tap method and/or the Graffiti method etc. Different HELP modes may be simply activated by speaking for example "HOW DO I USE MULTI-TAP" etc. The Microphone ON/OFF is an optional button to control the MIC when desired. For instance, when the background in noisy, the MIC may be simply turned OFF. Alternatively, to eliminate the automatic Voice-Activity-Detector (VAD) and to increase ASR accuracy in noise, a user may control the VAD manually: turn Mic-ON, speak, and turn Mic-Off and so on. The canned phrases displayed in FIG. 6D may be used for emergency mode.

Referring to FIGS. 6E and 6F, the simultaneous multimodality is shown. The user could use VoiceTap to enter the letters M and E but alternatively the user could have simply typed the letters using TrippleTap or T9. Note that the N-Best window displays only those alternatives that belong to the same sub-set lexicon as that chosen in the Main window. This is the outcome of the implementation of the system in the form of a state-machine, a state for each sub-set lexicon. Further notice that the N-Best window in FIG. 6F only displays words that begin with ME (the a priori information provided when user entered M, E). The MENU includes settings like SEND MESSAGE, CHOOSE VOICETAP OR VOICEPREDICT MODE, and TURN NBEST ON/OFF etc.

Referring to FIGS. 6G and 6H, the extension of recognition for phrases is displayed. In a multimodal fashion, the user enters H and simply says the sentence. The user could have entered H B P and said the sentence for increased accuracy. Observe that the HELP window contents change depending on which mode the user is in. For instance, the mode shown in FIG. 6H has all the sub-set lexicons present: the first two lines denote VoiceTap for alphabet and numbers respectively, the 3rd line is for VoicePredict, the 4th for Canned-Phrases, 5th for symbols, 6th for emoticons like smiley and 7-10 belong to the command state. Notice that this mode is a hands-free mode since any text may be entered without touching the keypad.

Referring to FIGS. 6I and 6J, it is shown that because standard phones may not have the ability to adjust microphone-gain-levels automatically, a user-interface prompts the user to "Speak softer . . . " Additionally, a user could select a sub-set of the states of FIG. 2A by using a MENU button. In FIG. 6J for instance, the states are divided into two groups. VoicePredict mode is purely multimodal because the user has to use the keypad to enter initial letters of the word/phrase. VoiceTap on the other hand is a hands-free mode where user could use VoiceTap to enter initial letters in addition to multimode.

FIGS. 7A-7G illustrate another embodiment of a user interface that may be implemented using the "always listening" configuration. Notice that the user-interface is enhanced by building on top of the standard user-interface. Thus, users have the option to fall back to an interface with which they are familiar in situations where speaking is undesirable. In FIG. 7-D, a speak-and-type user interface is chosen. However, the same system may be extended for type-and-speak interface or type-speak interface.

Finally, FIGS. 8A-8D illustrate another embodiment of a user interface that may be implemented. FIGS. 8A-8D illustrates an embodiment of an overall user-interface as an enhanced multimodal mobile user interface using a "Push-to-Speak" configuration for SMS/Email application.

Those skilled in art will recognize that other modifications may be made to the system to yield an enhanced multimodal user-interface. For instance, one could add commands like "Switch to T9" and "Switch to iTap" and "Switch to Tripple-Tap" and "Switch to Handwriting Recognition" and "Help Me with iTap" or "Help Me With Graffiti" etc.

This system is an independent stand-alone large vocabulary multimodal text-input system for mobile devices. Although the application displayed is for text-messaging, those skilled in art will recognize that with minor modifications, the same system could be used for MMS, IM, Email, Mobile-Search, Navigation or all of them put-together in one application. However, portions of the system may be used in conjunction with other systems for instance for error-correction of Dictation systems, for handicapped access systems etc. Further, the system may be incorporated with many other modes to yield the next-generation multimodal interface including: (a) keypad (b) qwerty-keyboard (c) soft-keyboard (d) handwriting recognition (e) graffiti recognition (f) optical character recognition (g) 9-digit telephone keypad (h) Word completion algorithms (i) Predictive Text methods (j) Multi-Tap methods and (k) VoiceMail attachments (which could be included within the body of the text itself as opposed to an independent mode).

Those skilled in art will recognize that other modifications may be made to the system to yield an enhanced multimodal user-interface. For instance, one could add commands like "Switch to Predictive Text" and "Switch to TrippleTap" and "Switch to Handwriting Recognition" and "Help Me with Prediction" etc.

Further, extensions to multiple languages (other than English) including but not limited to Chinese, Japanese, Korean, India (more generally Asian languages), French, German (more generally European languages), Spanish, Portuguese, Brazilian (other Latin American languages), Russian, Mexican, and in general any language. Some modifications may also been made to adjust for pronunciation variations, accents, and accounting for the large base alphabet, so as to customize the system for that language.

For instance, for languages like Chinese (referred to as languages based on ideographic characters as opposed to alphabetic characters) the phone keys are mapped to basic handwritten strokes (or their stroke categories) and the user could input the strokes for the desired character in a traditional order. Alternatively, based on a mapping of the keys to a phonetic alphabet, the user may enter the phonetic spelling of the desired character. In both these cases, the user selects the desired character among the many that match the input sequence from an array of alternatives that is typically displayed. The system proposed in this invention may be easily extended for these languages: (a) in a way that text prediction methods extend to multiple languages, (b) since these languages have many times different words depending on the tone or prosody of the word, additional states may be added to do such selection, and (c) additional states to insert diacritics (example vowel accents) for placing them on the proper characters of the word being spoken or corrected may be included.

Those skilled in art will also appreciate that the proposed invention leads to many interesting variants including the ability to send only a code determining the text and decoding the text at the receiver based on that code and a pre-set rule. For instance, assume the User typed the Phrase "Received Your Message", and then the system may send the information about where that phrase resides in the system lexicon and use the same to retrieve it at the receiver (assuming that the receiver has the same lexicon).

Further, there has been a surge in activities like standardizing the short forms or abbreviations being used in mobile communication. This includes phrases like Be-Right-Back (BRB), Laughing-Out-Loud (LOL) etc. The problem here is that the list is large and it's hard for end-users to remember all of them. The system's Phrase state may be easily extended to handle a multitude of such phrases. A user would then simply say the Phrase and enter initial letter; for instance Speak "Laughing out Loud" and type "L" or "L O" or "L O L" and so on.

Certain of the components described above may be implemented using general computing devices or mobile computing devices. To avoid confusion, the following discussion provides an overview of one implementation of such a general computing device that may be used to embody one or more components of the system described above.

Figure 9:
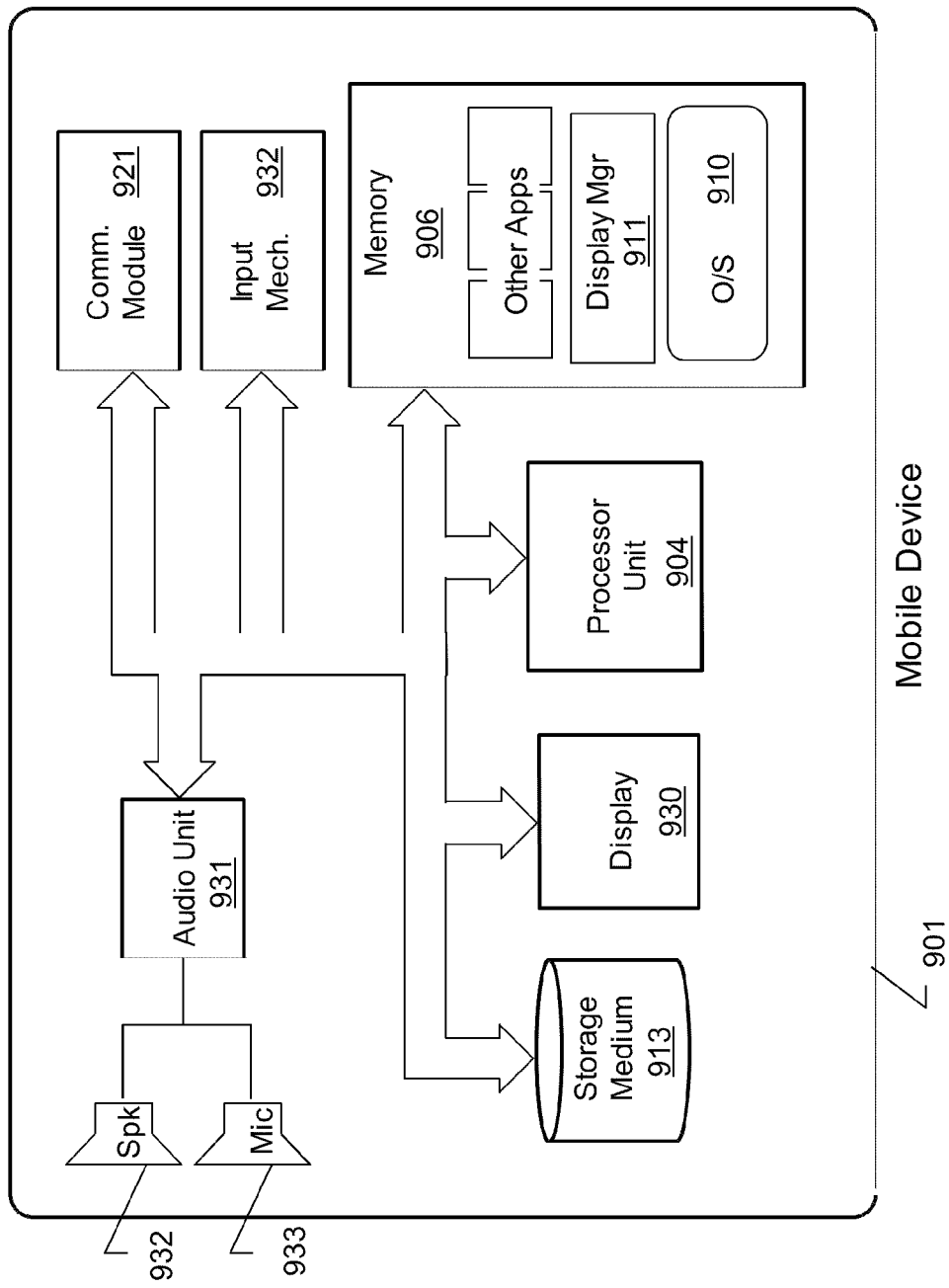
FIG. 9 is a block diagram representing a computing device in the form of a general purpose computer system with which embodiments of the present invention may be implemented.

FIG. 9 is a functional block diagram of a sample mobile device 901 that may be configured for use in certain implementations of the disclosed embodiments or other embodiments. The mobile device 901 may be any handheld computing device and not just a cellular phone. For instance, the mobile device 901 could also be a mobile messaging device, a personal digital assistant, a portable music player, a global positioning satellite (GPS) device, or the like. Although described here in the context of a handheld mobile phone, it should be appreciated that implementations of the invention could have equal applicability in other areas, such as conventional wired telephone systems and the like.

In this example, the mobile device 901 includes a processor unit 904, a memory 906, a storage medium 913, an audio unit 931, an input mechanism 932, and a display 930. The processor unit 904 advantageously includes a microprocessor or a special-purpose processor such as a digital signal processor (DSP), but may in the alternative be any conventional form of processor, controller, microcontroller, state machine, or the like.

The processor unit 904 is coupled to the memory 906, which is advantageously implemented as RAM memory holding software instructions that are executed by the processor unit 904. In this embodiment, the software instructions (e.g., computer-readable instructions) stored in the memory 906 include a display manager 911, a runtime environment or operating system 910, and one or more other applications 912. The memory 906 may be on-board RAM, or the processor unit 904 and the memory 906 could collectively reside in an ASIC. In an alternate embodiment, the memory 906 could be composed of firmware or flash memory.

The storage medium 913 may be implemented as any non-volatile memory, such as ROM memory, flash memory, or a magnetic disk drive, just to name a few. The storage medium 913 could also be implemented as a combination of those or other technologies, such as a magnetic disk drive with cache (RAM) memory, or the like. In this particular embodiment, the storage medium 913 is used to store data during periods when the mobile device 901 is powered off or without power. The storage medium 913 could be used to store contact information, images, call announcements such as ringtones, and the like.

The mobile device 901 also includes a communications module 921 that enables bi-directional communication between the mobile device 901 and one or more other computing devices. The communications module 921 may include components to enable RF or other wireless communications, such as a cellular telephone network, Bluetooth connection, wireless local area network, or perhaps a wireless wide area network. Alternatively, the communications module 921 may include components to enable land line or hard wired network communications, such as an Ethernet connection, RJ-11 connection, universal serial bus connection, IEEE 1394 (Firewire) connection, or the like. These are intended as non-exhaustive lists and many other alternatives are possible.

The audio unit 931 is a component of the mobile device 901 that is configured to convert signals between analog and digital format. The audio unit 931 is used by the mobile device 901 to output sound using a speaker 932 and to receive input signals from a microphone 933. The speaker 932 could also be used to announce incoming calls.

A display 930 is used to output data or information in a graphical form. The display could be any form of display technology, such as LCD, LED, OLED, or the like. The input mechanism 932 may be any keypad-style input mechanism. Alternatively, the input mechanism 932 could be incorporated with the display 930, such as the case with a touch-sensitive display device. Other alternatives too numerous to mention are also possible.

Figure 10:
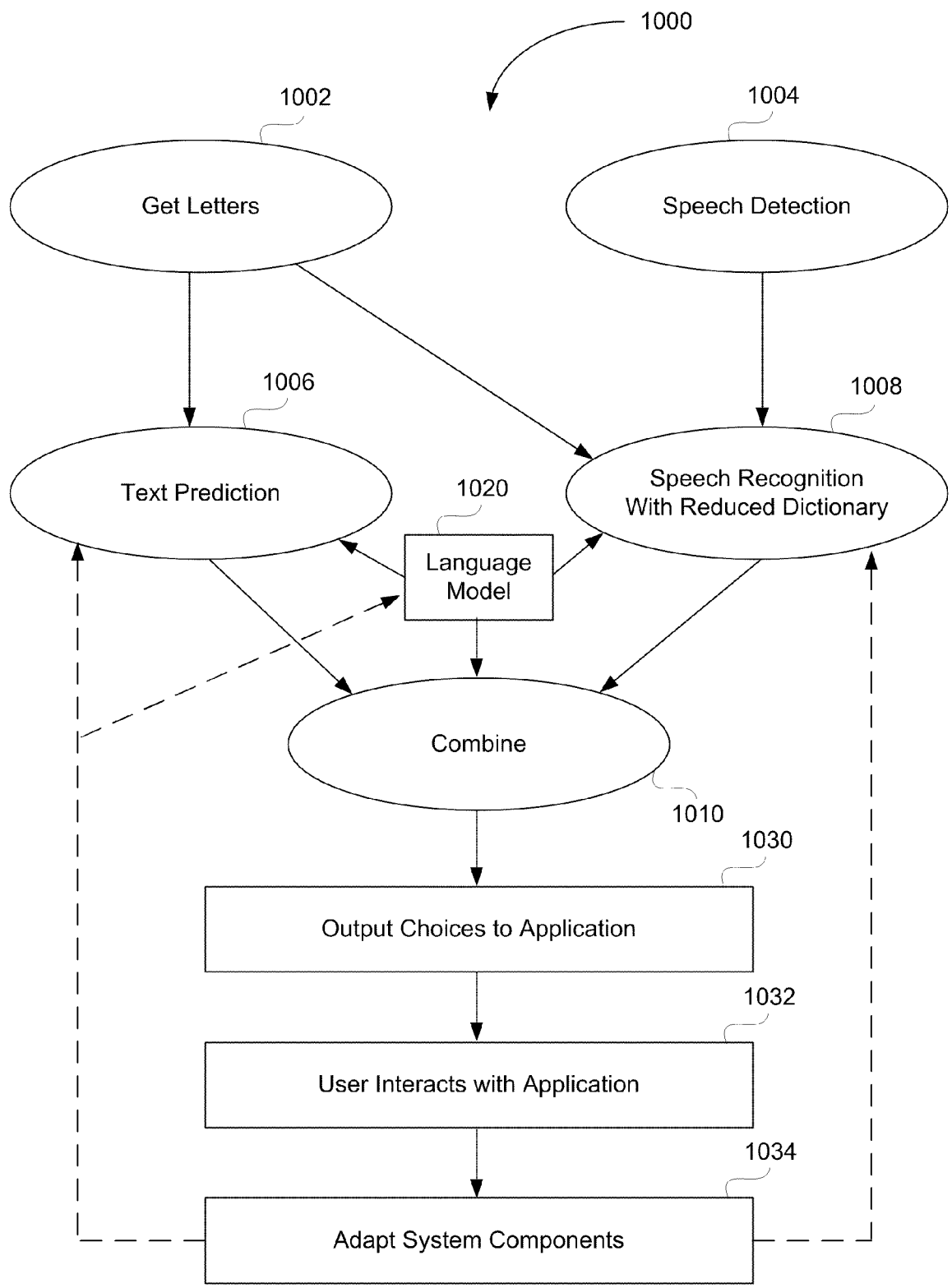
FIG. 10 is a functional diagram illustrating one embodiment for a multimodal system combining speech recognition and text prediction, where the speech recognition implements a reduced dictionary based on inputted letters.

FIG. 10 is a functional diagram illustrating one embodiment for a multimodal system 1000 combining speech recognition and text prediction, where the speech recognition implements a reduced dictionary based on inputted letters. In overview, the multimodal system 1000 includes several modules for performing various tasks, such as letter input 1002, speech detection 1004, text prediction 1006, and speech recognition 1008. In addition, multimodal system 1000 includes a combine 1010 module that accepts output from a language model 1020, from text prediction 1006, and speech recognition 1008. Language model 1020 supplies input to text prediction 1006, speech recognition 1008, and combine 1010.

Letter input 1002 may obtain letters input using various input mechanisms, such as hand, finger, stylus, and touch-based input mechanisms. The letters, which are input, are available as input to text prediction 1006 and to speech recognition 1008. Speech recognition 1008 combines text entered via a spoken counterpart, such as speech detection 1004 and letters from the letter input 1002. Combine 1010 receives output from text-prediction 1006, speech-recognition 1008, and language model 1020, and dynamically weighs the outputs based on a confidence value, which may be determined in real time. The actual weighting is done to compute, for each text choice, a total score that is a sum of an acoustic score (from speech recognition 1008), a language model score (from text-prediction 1006) and an adaptation score (which accounts for the adaptation in language model 1020 and acoustic scores based on the usage pattern and as determined by adapt system components 1034). One will note that if a user types without speaking or if the user's speech does not satisfy a desired signal-quality criteria determined by speech recognition 1008, output of combine 1010 is the output from text prediction 1006.

At block 1030, the output from combine 1010 is output as choices to an application. At block 1032, a user may interact via the application to influence the choices. If the choices are not acceptable by the user, adapt system components at block 1034 stores this information for the choices along with features like frequency of usage of the choices, pronunciation variations, and the like, which may be used to adapt the language model 1020 and acoustic model used in speech recognition 1008, to obtain better choices by performing text prediction 1006 and/or speech recognition 1008 the next time the user uses the system.

Those skilled in art will appreciate that several variants of system 1000 described in FIG. 10 may be developed. For instance, language models 1020 (including the dictionary of words, pronunciations, speaker profiles, and the like) used by text prediction 1006 and speech recognition 1008 may be shared or may be redundant. Combine 1010 may include other external inputs to assist in making better decisions on determining confidence. The choices in block 1030 may be played back in audio form. In addition, the speech detection may take various modes, such as always listening mode or a manual push-to-speak mode.

Figure 11:
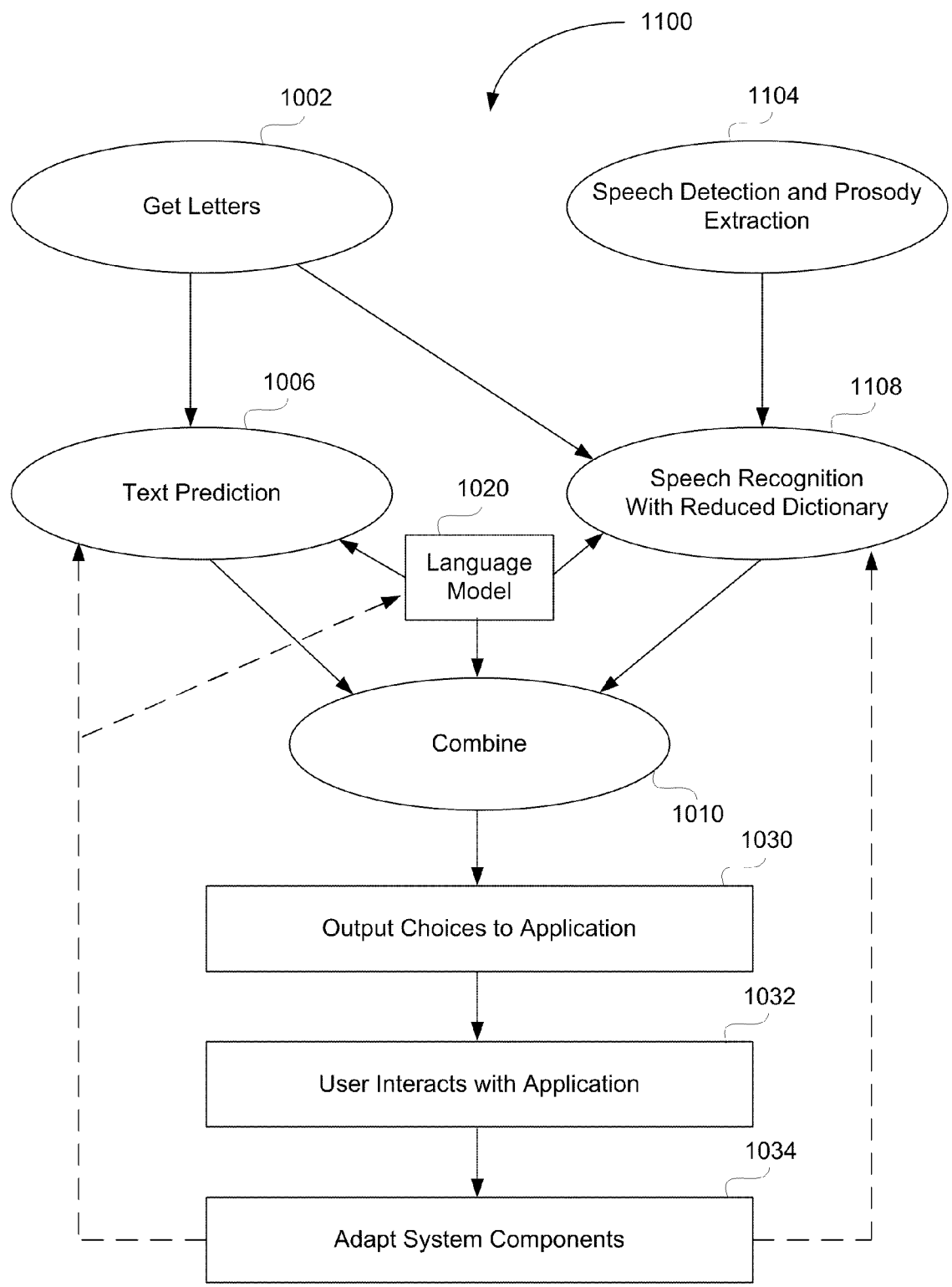
FIG. 11 is another embodiment for a multimodal system combining speech recognition and text prediction, where the speech recognition implements a reduced dictionary based on inputted letters and/or prosody extraction of spoken words.

FIG. 11 is another embodiment for a multimodal system 1100 combining speech recognition and text prediction, where the speech recognition implements a reduced dictionary based on inputted letters and/or prosody extraction of spoken words. As shown, multimodal system 1100 includes speech detection and prosody extraction 1104 module. The prosody extraction takes into account variations in syllable length, loudness, pitch, formant frequencies, and other characteristics of speech sounds. Speech detection and prosody extraction 1104 outputs extracted prosodic features to the speech recognition 1108 module, which reduces the search dictionary to entries that correlate with the extracted prosodic features and/or with typed letters from get letters 1002.

Figure 12:
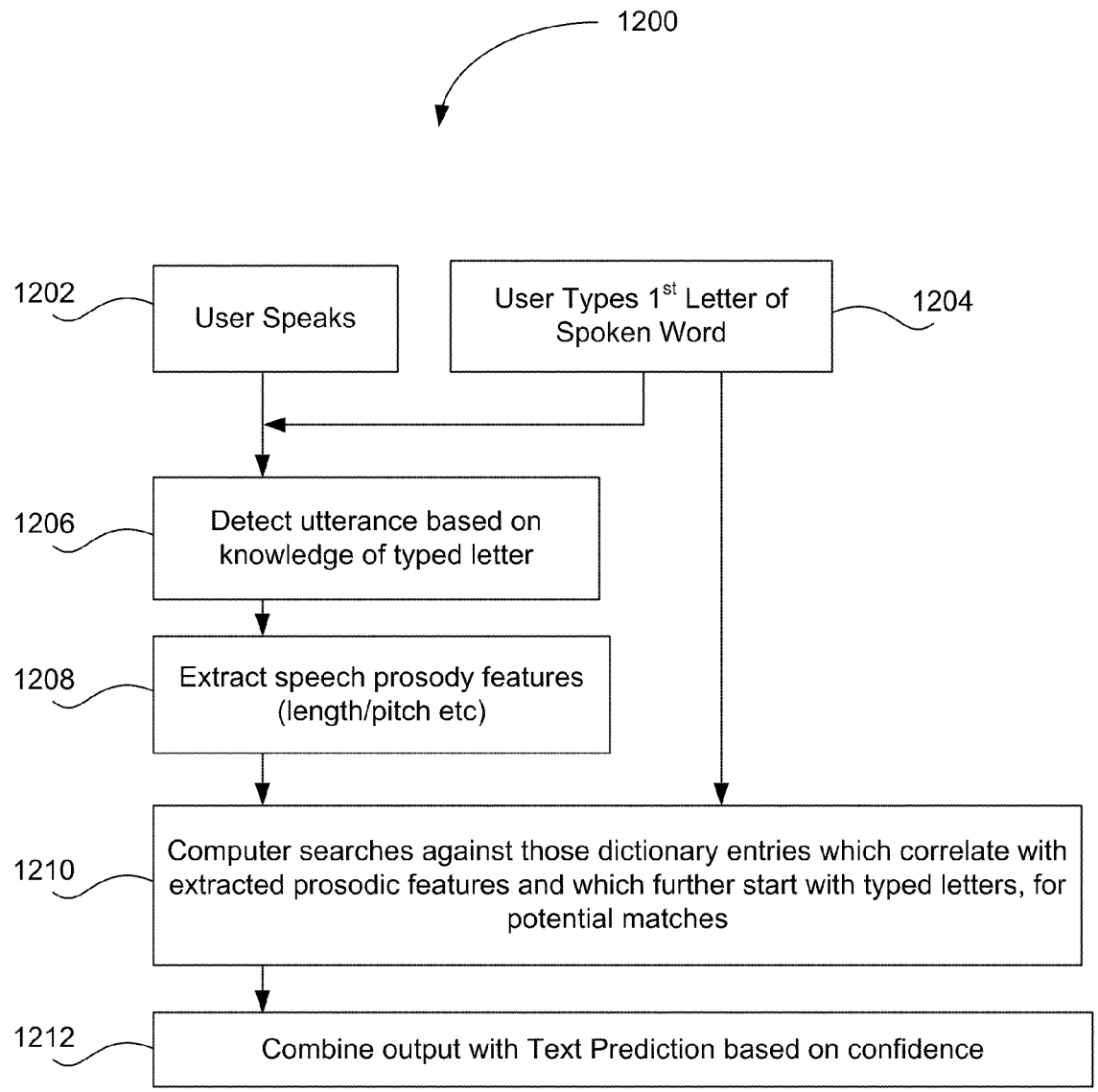
FIG. 12 is a flow diagram illustrating a process implemented by some embodiments of the multimodal system shown in FIG. 11.

FIG. 12 is a flow diagram illustrating a process 1200 implemented by a portion of the multimodal system shown in FIG. 11. At block 1202, a user speaks. At block 1204, a user may type a first letter of a spoken word. At block 1206, the results from block 1202 and 1204 are inputted to detect an utterance based on knowledge of the typed letter. Processing proceeds to block 1208.

At block 1208, prosody features, such as length, pitch, and the like, are extracted from the utterance. Processing proceeds to block 1210.

At block 1210, the search network is dynamically reduced based on those dictionary entries that correlate with the extracted prosodic features and start with typed letter from block 1204. This reduced network is then used for speech recognition to get a list of potential matches. Processing proceeds to block 1212.

At block 1212, the potential matches are combined with output from text prediction to obtain output choices based on a level of confidence of the text prediction and speech recognition. The actual combination involves computing, for each choice, a total score that is a sum of an acoustic score, a text prediction score, and, if applicable, an adaptation score (which accounts for the adaptation in language model and acoustic scores based on the usage pattern and as determined by adapt system components). Because the output of the speech recognition is combined with the output from text prediction, the resulting choices yields the best of both approaches.

Figure 13:
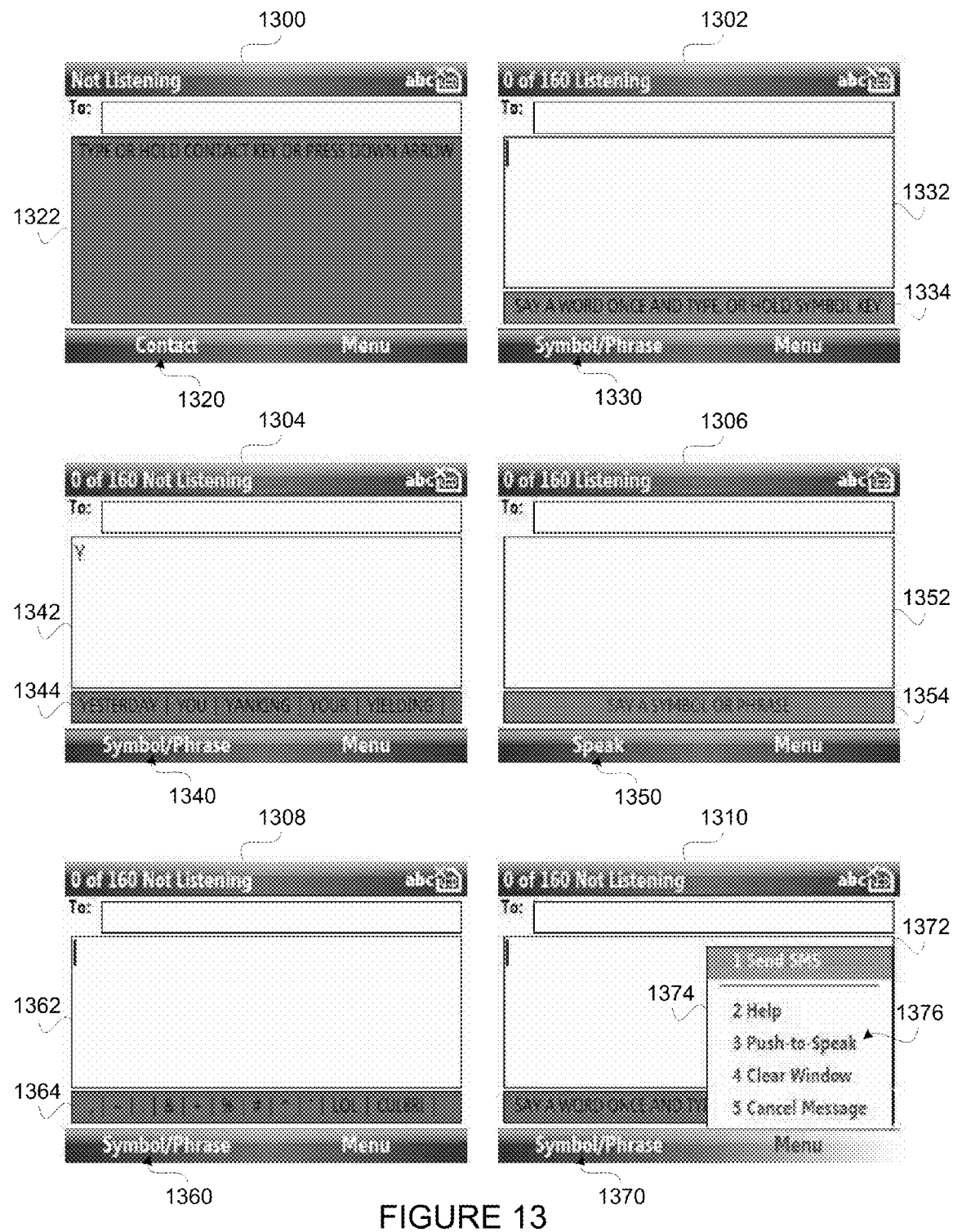
FIG. 13 illustrates a series of user interfaces for some embodiments of the multimodal system shown in FIG. 10 and/or FIG. 11.

FIG. 13 illustrates a series of user interfaces 1300-1310 for some embodiments of the multimodal system shown in FIG. 10 and/or FIG. 11. FIG. 1302 illustrates one embodiment of a text-input application, where the focus is on the "To" window. Observe that the left-soft key 1320 displays "CONTACT". To enter a contact, the user may simply type the letters for that contact name in the "To" window using standard text-prediction, or press the Contact left-soft-key 1320 to activate a "push-to-talk" feature for speaking a contact name before typing letters, for faster prediction of the contact name in accordance with some embodiments of the present multimodal speech recognition system. This action could be followed by pressing suitable keys to Call or Compose a message to that contact. After entering a contact name, the user may press the down-arrow key (not shown) to focus the application to Message window 1322.

FIG. 1302 illustrates the focus on Message window 1332. Below the Message window 1332, a status window 1334 is shown. The status window 1334 indicates a mode for the multimodal speech recognition system, such as an active and always listening mode as shown. The status window 1334 may appear in a different color, such as GREEN, to indicate this status. When the mode is active and always listening, the user may say a word and type its initial letters. The word is then displayed in the choice window.

FIG. 1304 illustrates a user interface after a user has spoken the word "Yesterday" and typed the letter "Y" in the message window 1342. A choice window 1344 may display choices based on the spoken word and the typed letter. For example, FIG. 1304 illustrates "Yesterday", "You", "Yanking", "Your", and "Yielding" as choices. In some embodiments, the choice window 1344 may change colors (e.g., orange) to indicate that the multimodal system is now predicting the words by combining what was spoken with the letters inputted. Soft-key 1344 has the words "Symbol/Phrase", which are mapped to a function that allows a user to enter symbol/phrases in addition to letters for a word. When a user presses soft-key 1344, the functionality associated with the soft-key changes to accept speech as shown in FIG. 1306.

FIG. 1306 illustrates a user interface in an Always Listening mode as designated by the word "Listening" in the title bar above the message window 1352. Status window 1354 has the words "SAY A SYMBOL OR PHRASE" to instruct the user to actions that are available. Soft-key 1354 has the words "Speak" and is mapped to a function that allows detection of speech. A user may press the left soft-key key 1350 and say "COMMA" and select "," from the choice-window 1364 in FIG. 1308. FIG. 1310 illustrates that the always-listening mode may be disabled by selecting the Push-to-Speak mode 1376 in a drop-down menu 1374. In this mode, the speech recognition component of the system gets activated only when user presses the left soft-key. In this mode, the left soft-key may be changed to reflect the symbol/phrase function by multi-pressing the center-key or other such variations.

Figure 14:
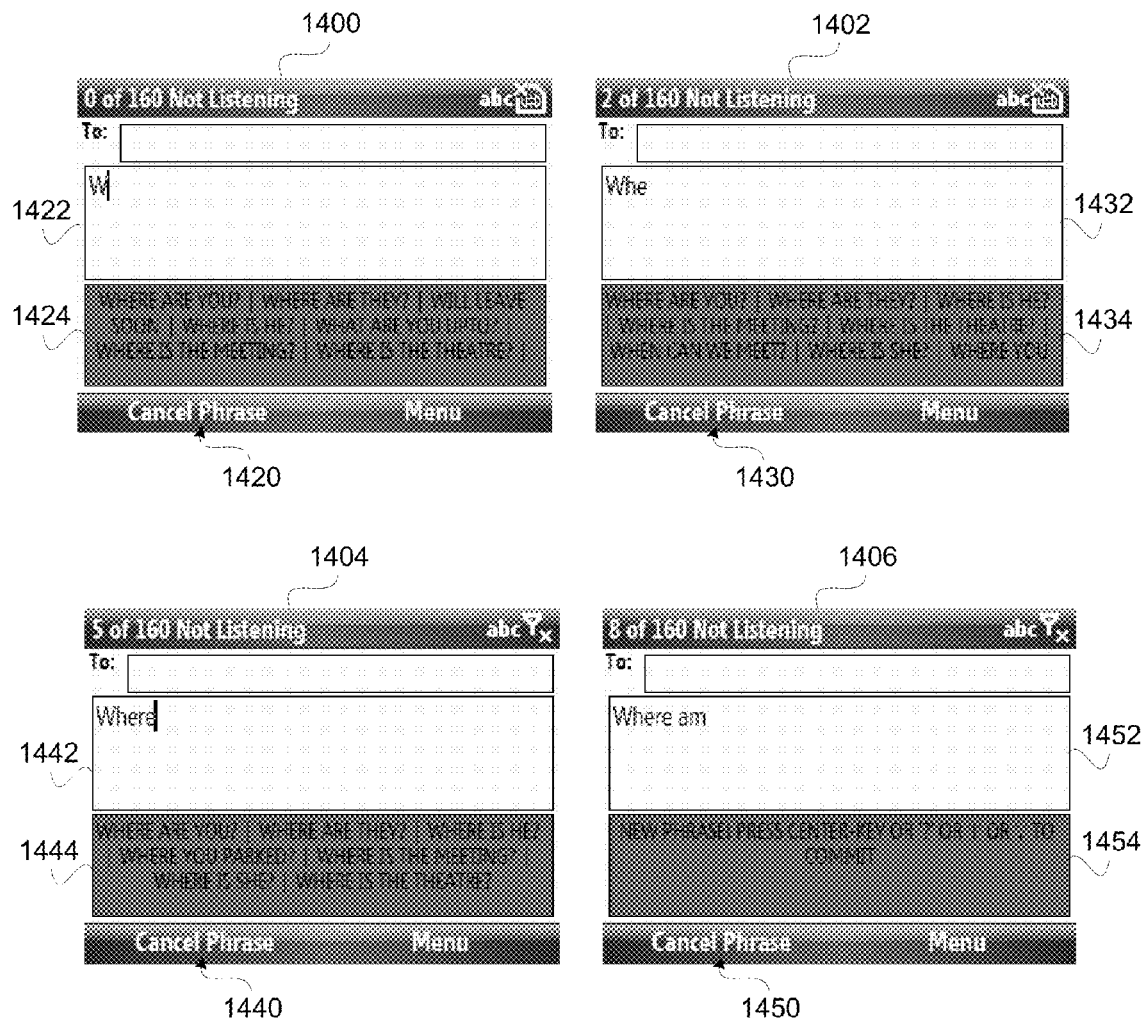
FIG. 14 illustrates another series of user interfaces for other embodiments of the multimodal system shown in FIG. 10 and/or FIG. 11.

FIG. 14 illustrates another series of user interfaces 1400-1406 for other embodiments of the multimodal system shown in FIG. 10 and/or FIG. 11. User interfaces 1400-1406 illustrate an extension that allows prediction of phrases in conjunction with words and symbols. Referring back to FIG. 1302, if a user selects soft-key 1330 when the soft-key is mapped to functionality for inputting symbols/phrases, FIG. 1400 appears once a first letter is typed into the message window. As shown, choice window 1424 displays phrases instead of words and/or symbols that begin with the first letter that was typed. In contrast with the operation shown by FIGS. 1304-1306, which illustrated selection of a symbol when the left soft-key 1330 was pressed, FIGS. 1400-1406 illustrate what happens when letters are typed after using the symbol/phrase push-to-speak functionality, which results in the system entering the phrase prediction state. The phrase prediction state displays the choices of phrases in the choice windows 1424 1434, 1444, and 1454 based on a sequence of letters typed in the corresponding message windows 1422, 1432, 1442, and 1452. One will note that in some embodiments the size of the choice window changes to indicate the user that the system is predicting phrases as opposed to symbols or words and further the left soft-keys 1420 1430, 1440, and 1450 now displays "Cancel Phrase" to further indicate that the system is in phrase prediction state. Those skilled in art will appreciate that this form of design permits the system to have similar interfaces for predicting and selecting phrases and words. Thus, the user may select the phrases using the arrow keys or by typing subsequent letters of the phrase.

One will observe that when the user enters additional letters of the phrase, the choices are narrowed based on the additional letters as shown in choice windows 1434 and 1444. A major difference between words and phrases is that a phrase consists of words separated by <spaces>. In the present multimodal speech recognition system, the word-prediction state exits when a user enters a <space>. However, for phrase prediction, a <space> is actually used to filter the list of the choices of phrases. The system exits from the phrase prediction state when the user presses the "Cancel Phrase" soft-key 1440; or when the user terminates a phrase with a pre-determined set of symbols; or when system automatically detects that a phrase has been entered.

Confusion may occur when a user enters a <space> while the system is in phrase-prediction state. The confusion occurs because it is not clear whether the user intends to exit the phrase-prediction mode and begin the next word or whether the user intends to provide the next word of the same phrase to be adapted. In the present multimodal speech recognition system, the adaptation to new words and phrases may be done transparent to the user; when the choice-list of words/phrases is empty. One approach may use a fairly intuitive technique for adapting new-words. In this approach, a feedback is provided to the user as shown in FIG. 1406, which inquires in status window 1450 whether to add a new phrase or not. For example, status window 1450 displays the text "NEW PHRASE! PRESS CENTER-KEY OR '?' OR '?' OR '!' OR '.' TO COMMIT". Other wordings for the inquiry may also be used, such as "new phrase is being added . . . press cancel to exit".

Those skilled in art will recognize that several user-interface variants for the present multimodal interface may be designed and implemented. For instance, instead of the soft-key, a dedicated button may be used for the symbol/phrase prediction. Further these two modes may be separated by two separate keys/buttons. The order in which the prediction functions are designed may be reversed. For example, phrase-prediction may be done in always-listening mode and word/symbol prediction may be done using a push-to-speak configuration. Further, the choice window may be designed as a drop-down window and its fonts/color/size may be changed to indicate change in state of the multimodal system. The phrase prediction may be done using a sequential commit user-interface wherein only the next word is presented to the user at any given instant; as opposed to the entire phrase.

Figure 15:
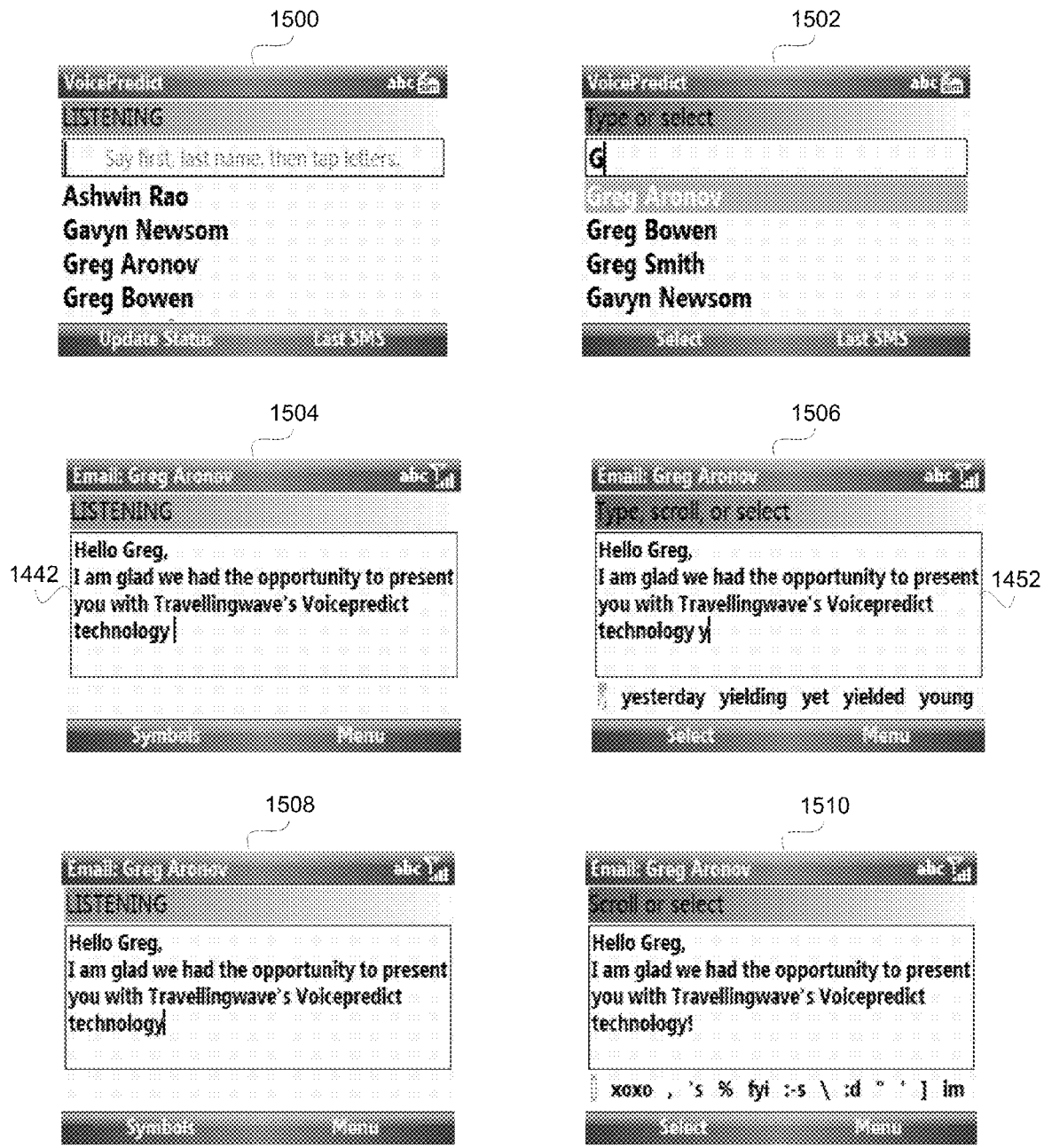
FIG. 15 illustrates another series of user interfaces for some other embodiments of the multimodal system shown in FIG. 10 and/or FIG. 11 in which a consistent user interface is provided for an always listening mode.

FIG. 15 illustrates another series of user interfaces 1500-1510 for some other embodiments of the multimodal system shown in FIG. 10 and/or FIG. 11, in which a consistent user interface is provided for an always listening mode. Referring to FIG. 1500, a user may see a traditional screen with all the contacts and may select those contacts by scrolling or typing. Additionally, the user has an option to speak (without pressing any additional keys) and then start typing to access these contacts with fewer key-presses. Thus, as per FIG. 1500, the system is "Listening" for a contact name and if the user types a letter then as per FIG. 1502, the system combines the speech and the letters to present the user a list of contact names that correspond to the speech and letters. The user may now continue typing or scroll or select. The same user interface is extended to entering words when the user is in a composition window 1514 as shown in FIG. 1504 and FIG. 1506. Once again, the user could simply type some text or speak the text and then type letters for faster text-prediction. Observe that the interface is always listening and consistent with the previous interface for entering contacts. If the user wishes to insert a symbol, then as per FIG. 1508 and FIG. 1510, a user speaks the symbol, then taps the symbol key, and subsequently scrolls and selects. Once again, this is consistent with the previous user interfaces for entering contact names and words using always listening mode. These and other variation of entering text and speech are envisioned.

The claimed invention is:

1. A multimodal system, the system comprising:
a speech detection module configured to detect audio;
a speech recognition module configured to accept the audio and at least one letter input, to dynamically create a reduced dictionary based on the at least one letter input, to search the reduced dictionary for a set of speech recognized words based on the detected audio, and to determine an acoustic score for each of the speech recognized words;
a text prediction module configured to accept the least one letter input, to predict a set of predicted words associated with the at least one letter input and to determine a language model score for each of the predicted words; and
a combine module configured to accept the set of predicted words and the set of speech recognized words and to create a set of choice words, wherein the set of choice words is based upon a dynamic weight determined for each of the speech recognized words and each of the predicted words using the respective acoustic score and language model score, wherein the set of choice words is output to aid in a determination of a subsequent user-action.

2. The multimodal system of claim 1, wherein the subsequent user-action provides usage data that the speech recognition module takes into account when dynamically creating the reduced dictionary.

3. The multimodal system of claim 1, further comprising a user-interface module configured to accept an interaction by a user with respect to the choice words.

4. The multimodal system of claim 3, wherein the interaction by the user initiates another cycle of text prediction, speech recognition, and combining to obtain another set of choice words.

5. The multimodal system of claim 1, further comprising an adaption module configured to determine an adaption score based on a usage pattern, and the set of choice words being further based on the adaption score.

6. The multimodal system of claim 5, wherein the usage pattern is based on a selected word from the set of choice words.

7. A computer-implemented method for multimodal text recognition, comprising:
a) detecting an utterance that is spoken;
b) extracting at least one prosodic feature associated with the utterance;
c) dynamically reducing a dictionary based on the at least one prosodic feature and searching the dictionary for at least one entry starting with the first letter typed;
d) determining a set of potential matches from the at least one entry and determining an acoustic score related to each potential match in the set of potential matches;
e) determining a set of predicted matches using a text prediction technique based on the first letter typed and determining a language model score related to each of the predicted matches within the set of predicted matches;
f) combining the set of potential matches with the set of predicted matches into a combined list by dynamically weighing the potential matches and the predicted matches based on their corresponding acoustic scores and language model scores, respectively;
g) determining a set of choice words based on a confidence value determined for each entry in the combined list.

8. The computer-implemented method of claim 7, further comprising dynamically reducing the dictionary based on the first letter typed.

9. The computer-implemented method of claim 7, further comprising providing the set of choice words to an application.

10. The computer-implemented method of claim 7, further comprising accepting an interaction by a user with respect to the set of choice words.

11. The computer-implemented method of claim 10, wherein the interaction by the user initiates processing to perform steps c-g to obtain another set of choice words.

12. A computing device configured to provide a multimodal interface for entering text, the computing device comprising:
- a computer storage medium including computer-readable instructions:
- a processor configured by the computer-readable instructions to:
  - provide a user-interface for entering and displaying text;
  - detect audio when the user-interface is in a listening mode;
  - recognize input of a first letter into a message window of the user-interface;
  - dynamically reduce a search dictionary based on the first letter;
  - search the search dictionary based on the detected audio to determine a set of speech recognized words;
  - predict a set of predicted words based on the first letter and determine a language model score for each of the predicted words;
  - create a set of choice words based upon a dynamic weight determined for each of the speech recognized words and each of the predicted words using the respective acoustic score and language model score of the predicted words and the speech recognized words, respectively; and
  - display the set of choice words in a choice window of the user-interface to aid in a determination of a subsequent user-action, wherein the subsequent user-action provides usage data that affects the dynamic reduction of the search dictionary.

13. The computing device of claim 12, further comprising a soft-key on the user-interface for switching modes.

14. The computing device of claim 13, wherein the mode comprises a symbol mode for inputting a spoken word for a symbol and selecting one of a set of characters displayed on the user-interface for the symbol.

15. The computing device of claim 13, wherein the mode comprises a phrase mode for inputting spoken words for a phrase and selecting one of a set of phrases displayed on the user-interface based on the first letter.

16. The computing device of claim 15, wherein the processor is further configured by the computer-readable instructions to recognize input of a second letter and modify the set of phrases displayed on the user-interface based on the first and second letter.

17. The computing device of claim 12, wherein the user-interface further comprises a menu item to switch between a "Push-to-Speak" mode and a "Listening" mode for detecting the audio.

* * * * *